US010113344B2

(12) United States Patent
Oshima et al.

(10) Patent No.: US 10,113,344 B2
(45) Date of Patent: Oct. 30, 2018

(54) STAY

(71) Applicant: SUGATSUNE KOGYO CO., LTD., Chiyoda-ku, Tokyo (JP)

(72) Inventors: Kazuyoshi Oshima, Tokyo (JP); Hiroyuki Ishii, Tokyo (JP); Koushi Yamaguchi, Tokyo (JP); Kenta Naganuma, Tokyo (JP)

(73) Assignee: Sugatsune Kogyo Co., Ltd., Chiyoda-ku (JP)

( * ) Notice: Subject to any disclaimer, the term of this patent is extended or adjusted under 35 U.S.C. 154(b) by 713 days.

(21) Appl. No.: 14/651,623

(22) PCT Filed: Nov. 13, 2013

(86) PCT No.: PCT/JP2013/080696

§ 371 (c)(1),
(2) Date: Jun. 11, 2015

(87) PCT Pub. No.: WO2014/091860

PCT Pub. Date: Jun. 19, 2014

(65) Prior Publication Data

US 2015/0330125 A1 Nov. 19, 2015

(30) Foreign Application Priority Data

Dec. 11, 2012 (JP) ................................ 2012-270023
Apr. 2, 2013 (JP) ................................ 2013-076849

(51) Int. Cl.
*E05D 11/10* (2006.01)
*E05C 17/64* (2006.01)
(Continued)

(52) U.S. Cl.
CPC ............ *E05C 17/24* (2013.01); *E05C 17/345* (2013.01); *Y10T 292/301* (2015.04)

(58) Field of Classification Search
CPC ....... Y10T 16/540345; Y10T 16/54035; Y10T 16/54038; Y10T 16/540255;
(Continued)

(56) References Cited

U.S. PATENT DOCUMENTS 1,472,920 A * 11/1923 Lane .................... E05C 17/345 16/404
1,644,249 A * 10/1927 Harrison ............... E05D 11/084 16/340
(Continued)

FOREIGN PATENT DOCUMENTS

EP 1209308 A1 * 5/2002 ............. E05C 17/34
GB 377445 A * 7/1932 ........... E05C 17/163
(Continued)

OTHER PUBLICATIONS

ISA/JP, International Search Report dated Feb. 18, 2014 in PCT Application No. PCT/JP2013/080696, 7 pages with translation.

*Primary Examiner* — Chucky Y Mah
(74) *Attorney, Agent, or Firm* — Masuvalley & Partners

(57) ABSTRACT

Provided is a stay which is capable of stabilizing movement of a component part used for transmitting, or not transmitting, the torque of one of a first member and a second member to the other. When a second member rotates relative to a first member in one direction, a cam base moves away from a disk in the direction of the rotation axis, and the second member and the cam base rotate relative to the first member and the disk. When the second member rotates relative to the first member in the opposite direction, the cam base moves towards the disk in the direction of the rotation axis, and the second member, the cam base and disk rotate relative to the first member with resistance force.

8 Claims, 21 Drawing Sheets

(51) Int. Cl.
*E05C 17/24* (2006.01)
*E05C 17/34* (2006.01)

(58) Field of Classification Search
CPC ..... Y10T 16/5387; E05C 17/24; E05C 17/34; E05C 17/345; E05D 11/084; E05D 11/087; E05D 2011/088; E05D 15/04; E05D 3/16; E05D 3/20
See application file for complete search history.

(56) References Cited

U.S. PATENT DOCUMENTS

| | | | | | |
|---|---|---|---|---|---|
| 2,012,731 | A * | 8/1935 | Sasgen | E05C 17/34 | 292/204 |
| 2,277,105 | A * | 3/1942 | Herzog | H04H 20/67 | 455/105 |
| 2,288,540 | A * | 6/1942 | Olson | E05C 17/345 | 292/263 |
| 2,736,027 | A * | 2/1956 | Parmelee | A61F 9/06 | 16/340 |
| 6,584,645 | B2 * | 7/2003 | Migli | E05C 17/34 | 16/337 |
| 6,862,779 | B1 * | 3/2005 | Lu | G06F 1/1616 | 16/337 |
| 7,147,191 | B2 * | 12/2006 | Ichikawa | F16M 11/10 | 248/292.12 |
| 7,219,393 | B2 * | 5/2007 | Kida | G06F 1/1616 | 16/221 |
| 7,320,152 | B2 * | 1/2008 | Lowry | E05C 17/64 | 16/297 |
| 7,509,709 | B2 * | 3/2009 | Chung | G06F 1/1616 | 16/319 |
| 7,565,719 | B2 * | 7/2009 | Su | E05D 11/087 | 16/337 |
| 8,943,649 | B2 * | 2/2015 | Chen | G06F 1/1681 | 16/320 |
| 2006/0048337 | A1 * | 3/2006 | Lowry | E05C 17/64 | 16/342 |
| 2007/0011848 | A1 * | 1/2007 | Lu | G06F 1/1616 | 16/340 |
| 2007/0094842 | A1 * | 5/2007 | Chang | G06F 1/1616 | 16/330 |
| 2007/0136992 | A1 * | 6/2007 | Lu | E05D 11/1078 | 16/330 |
| 2015/0211529 | A1 * | 7/2015 | Minteer | F04D 15/0066 | 417/15 |

FOREIGN PATENT DOCUMENTS

| | | | |
|---|---|---|---|
| JP | H02-103478 | U | 8/1990 |
| JP | H03-095482 | U | 9/1991 |
| JP | 2006-503235 | A | 1/2006 |
| JP | 2010-248800 | A | 11/2010 |

* cited by examiner

Cross-Sectional View b-b

Cross-Sectional View b-b

Cross-Sectional View b-b

Cross-Sectional View b-b

STAY

CROSS-REFERENCE TO RELATED APPLICATIONS

This application is the national phase entry under 35 U.S.C. § 371 of International Application No. PCT/JP2013/080696, filed on Nov. 13, 2013, which claims priority under 35 U.S.C. § 119 to Japanese Patent Application No. 2012-270023, filed on Dec. 11, 2012 and Japanese Patent Application No. 2013-076849, filed on Apr. 2, 2013, the contents of which are hereby incorporated by reference in their entirety for all purposes.

TECHNICAL FIELD

The present invention pertains to a stay interposed between a door of furniture or the like and a main body, and more particularly pertains to a stay interposed between a door rotating around a horizontal rotation axis and a main body.

BACKGROUND OF THE INVENTION

Furniture having a door which rotates around a horizontal rotation axis is used, for example, in a hanging cupboard for a kitchen. A hanging cupboard for a kitchen is positioned near the ceiling, and therefore opening a door upward is convenient. A stay is interposed between a door and a main body, and supports the weight of a door that is opened to an arbitrary opening angle such that the door closes slowly.

An issue with furniture having a door that rotates around a horizontal rotation axis is that the moment of the door changes with the opening angle of the door. For example, if a door is opened upward, when the door is at the maximum opening position, the stay is subjected to a large moment from the door. On the other hand, when the door is close to the closed position, the stay is only subjected to a small moment from the door.

A typical stay is equipped with a first arm and a second arm which are connected so as to be capable of rotating around a rotation axis in two mutually opposing directions. For example, a free end of the first arm is connected to a housing, and a free end of the second arm is connected to the door. The first arm and the second arm rotate freely in one direction and rotate with a resistance force attributed to frictional force in an opposite direction. When the door is opened, the first and the second arms rotate freely with each other, and thus the door can be opened with a light force. On the other hand, when a person lets go of a door which has been opened to an arbitrary angle, the door tries to return to the closed position under its own weight. However, when the first arm and the second arm are rotated in the other direction, a frictional force works between the first arm and the second arm, and therefore the position of the door opened to an arbitrary angle can be maintained. When closing the door, the door is pushed in the closing direction, and the first arm and the second arm rotate in the other direction in opposition to the resistance force between the first arm and the second arm.

An example of this type of stay is shown in FIGS. 24A and 24B (see U.S. Pat. No. 6,584,645). This stay uses a combination of a friction element and a wedge element, and is provided with a first arm 1, a second arm 2, a disk 3 housed in a ring-shaped crown 2*a* of the second arm 2 so as to be capable of rotating around a rotation axis, an elastic member 4 which presses the first arm 1 to the disk 3, and rollers 5 interposed between a first opposing surface 3*a* of the disk 3 and a second opposing surface 2*a*1 of the crown 2*a* of the second arm 2. A width of a gap between the first opposing surface 3*a* and the second opposing surface 2*a*1 gradually narrows in a clockwise direction (1).

When the second arm 2 rotates in a counterclockwise direction (2), the rollers 5 move to a gap that is wider between the first opposing surface 3*a* and the second opposing surface 2*a*1. Therefore, the torque of the second arm 2 is not transmitted to the first arm 1, and the second arm 2 rotates freely in the counterclockwise direction (2) with respect to the first arm 1. On the other hand, when the second arm 2 rotates in the clockwise direction (1), the rollers 5 move to the gap that is narrower between the first opposing surface 3*a* and the second opposing surface 2*a*1, and become stuck therebetween. Therefore, the torque of the second arm 2 is transmitted to the first arm 1. When the torque acting on the second arm 2 is larger than the frictional force between the disk 3 and the first arm 1, the disk 3 slides with respect to the first arm 1. Accordingly, the second arm 2 rotates with resistance force in the counterclockwise direction (2) with respect to the first arm 1.

SUMMARY OF THE INVENTION

With the invention disclosed by Patent Document 1, as the rollers 5 move in a gap between the first opposing surface 3*a* and the second opposing surface 2*a*1, the torque of the second arm 2 is transmitted to the first arm 1, and transmission of the torque of the second arm 2 to the first arm 1 is cancelled. However, because a gap is present around the rollers 5, it is difficult to stabilize the movement of the rollers 5, which is a problem. In order to stabilize the movement of the rollers 5 with the stay described by Patent Document 1, an elastic member made of a plate spring is provided in the gap, but there is a limitation to the stabilization of the movement of the rollers 5. Moreover, the durability of the elastic member also generates a new problem.

Therefore, an object of the present invention is to provide a stay which is capable of stabilizing movement of a component part used for transmitting or not transmitting the torque of one of a first member and a second member to the other.

In order to solve the abovementioned problems, the invention set forth by claim 1 is a stay including a first member; a second member connected to the first member so as to be capable of rotating around a rotation axis in two opposing directions relatively; a disk joined to the first member through frictional force; and a cam base capable of rotating around the rotation axis in an integrated manner with the second member, and capable of moving in a direction of the rotation axis through relative rotation of the second member with respect to the first member; wherein, when the second member rotates relative to the first member in one direction, the cam base moves away from the disk in the direction of the rotation axis, and the second member and the cam base rotate relative to the first member and the disk; and when the second member rotates relatively to the first member in the other direction, the cam base moves towards the disk in the direction of the rotation axis, and the second member, the cam base and the disk rotate relative to the first member with resistance force.

The invention set forth by claim 2 is the stay according to claim 1, one of the second member and the cam base further including a convex part protruding to the other of the second member and the cam base; and the other of the second member and the cam base further including a concave part which fits with the convex part; wherein, when the second member rotates in the other direction relative to the first member, the convex part and the concave part come into contact, resulting in the cam base moving toward the disk in the direction of the rotation axis; and even after the cam base has moved toward the disk in the direction of the rotation axis, the concave part remains fitted with the convex part.

The invention set forth by claim 3 is the stay according to claim 2, the disk and the cam base further including a plurality of teeth at mutually opposing surfaces; wherein, when the second member rotates relative to the first member in the one direction, the plurality of teeth of the disk and the plurality of teeth of the cam base come into contact, resulting in the cam base moving away from the disk in the direction of the rotation axis.

The invention set forth by claim 4 is the stay according to claim 3, wherein the plurality of teeth of the disk and of the cam base are arranged at the mutually opposing surfaces in a ring shape along the perimeter of the rotation axis.

The invention set forth by claim 5 is the stay according to any one of claims 1 to 4, further comprising a position retention means between the disk and the cam base for allowing the cam base to move in the direction of the rotation axis with respect to the disk, and for temporarily retaining a position of the cam base in the direction of the rotation axis.

The invention set forth by claim 6 is the stay according to claim 5, wherein the position retention means is a resin ring which is supported by either the disk or the cam base and slides on the other.

The invention set forth by claim 7 is the stay according to any one of claims 1 to 4, wherein one end of the first member is capable of rotating with respect to one of a main body and a door; one end of the second member is capable of rotating with respect to the other of the main body and the door; and the other end of the first member and the other end of the second member are capable of rotating mutually.

The invention set forth by claim 8 is the stay according to any one of claims 1 to 4, wherein one end of the first member is capable of rotating with respect to one of the main body and the door; the second member is fixed to the other of the main body and the door; and the other end of the first member and the second member are capable of rotating.

The invention set forth by claim 9 is the stay according to any one of claim 8, wherein the first member is capable of bending at a middle part between the one end and the other end; and the second member further includes a catch mechanism which retains a state where the second member is extended, and retains a state where the second member is bent.

According to the invention set forth by claim 1, when the second member is rotated, the cam base moves towards the disk or moves away from the disk through the cam principle. Because the cam base is moved in a direction of the rotation axis, the movement of the component part (cam base) used to transmit torque can be stabilized.

According to the invention set forth by claim 2, the cam base can be moved toward the disk by a convex part of one of the second member and the cam base and a concave part of the other. Moreover, even after the cam base moves toward the disk in the direction of the rotation axis, the convex part remains fitted with the concave part, and therefore the second member and the cam base can be integrally rotated.

According to the invention set forth by claim 3, the cam base can be moved away from the disk in the direction of the rotation axis by the plurality of teeth of the disk and the cam base.

According to the invention set forth by claim 4, the torque of one of the first member and the second member can be reliably transmitted to the other.

According to the invention set forth by claim 5, the position of the cam base can be temporarily maintained. Therefore, once the cam base has been separated from the disk, it can be prevented from once again contacting the disk and generating a rattling sound.

According to the invention set forth by claim 6, the position of the cam base can be temporarily maintained by a resin ring.

As with the invention set forth by claim 7, one end of the first member is capable of rotating to one of a main body and a door, one end of the second member is capable of rotating to the other of the main body and the door, and the other end of the first member and the other end of the second member are capable of rotating mutually.

As with the invention set forth by claim 8, one end of the first member is capable of rotating to one of the main body and the door, the second member is fixed to the other of the main body and the door, and the other end of the first member and the second member are capable of rotating.

According to the invention set forth by claim 9, an opened state and a closed state of the door can be maintained by a catch mechanism.

BRIEF DESCRIPTION OF DRAWINGS

(FIG. 2A is a front view, and FIG. 2B is a side view.)

(FIG. 6A shows a plan view, FIG. 6B shows a cross-sectional view, FIG. 6C shows a side view, and FIG. 6D shows a bottom view.)

(FIG. 7A shows a plan view, FIG. 7B shows a cross-sectional view, FIG. 7C shows a side view, and FIG. 7D shows a bottom view.)

(FIG. 9A shows a state with the cam base moved toward the disk, and FIG. 9B shows a state with the cam base moved away from the disk.)

(FIG. 12A shows a plan view, and FIG. 12B shows a cross-sectional view.)

(FIG. 13A shows a state prior to attachment, FIG. 13B shows a state during attachment, and FIG. 13C shows a state after attachment.)

(FIG. 19A is a front view, and FIG. 19B is a side view.)

(FIG. 22A shows the door in an opened state, and FIG. 22B shows the door in a closed state.)

(FIG. 24A shows a plan view (including a partial cross-section), and FIG. 24B shows a cross-sectional view.

DETAILED DESCRIPTION OF THE INVENTION

Figure 1:
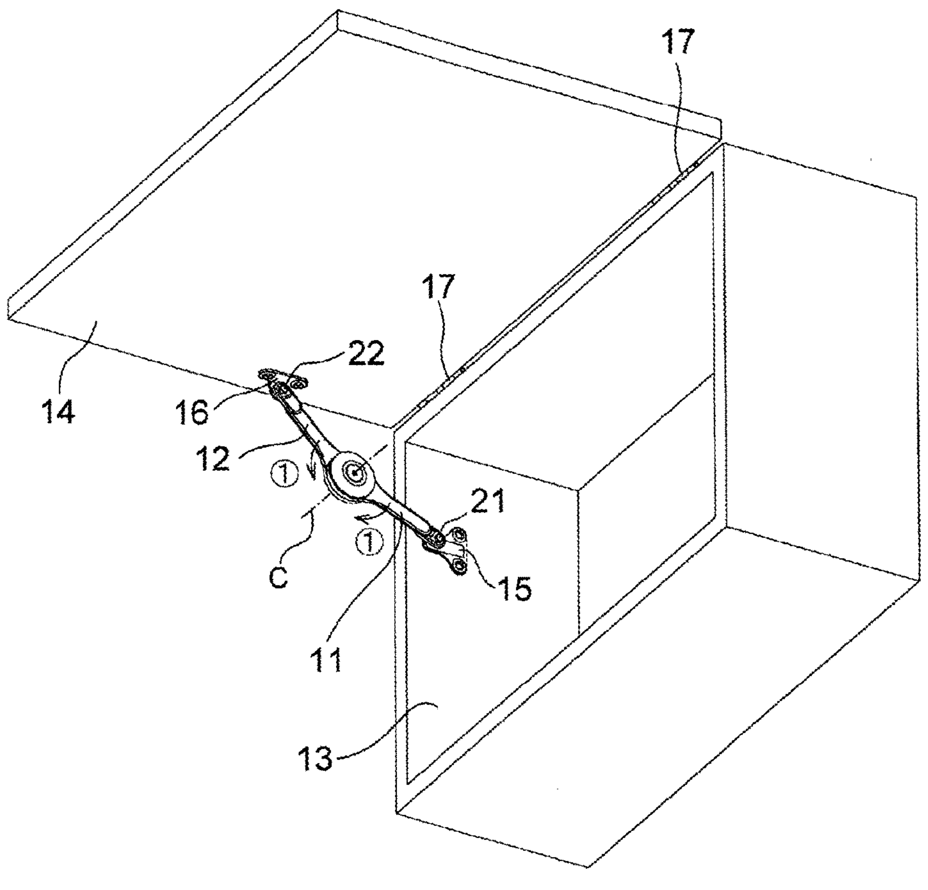
FIG. 1 is a perspective view showing an example which uses a stay of a first embodiment of the present invention in an upward opening type cabinet.

A stay of a first embodiment of the present invention is described in detail below based on the attached drawings. FIG. 1 shows an example which uses a stay of the present embodiment in an upward opening type cabinet. The stay is equipped with a first arm 11 as a first member and a second arm 12 as a second member which are connected so as to be capable of rotating with each other around a rotation axis C. A free end, which is one end part of the first arm 11 in the lengthwise direction, is attached to an inner wall surface of a box-shaped main body 13 via a washer 15 so as to be capable of rotation. A free end, which is one end part of the second arm 12 in the lengthwise direction, is attached to a door 14 via a washer 16 so as to be capable of rotation. The other end in the lengthwise direction of the first arm 11 and the other end in the lengthwise direction of the second arm 12 are connected in a rotatable manner. When the door 14 is opened, the first arm 11 and the second arm 12 rotate freely with each other in the (1) direction, and therefore, the stay does not generate resistance force.

The stay of the present embodiment has a free-stop function or a slowdown function. The free-stop function is a function for which the stay maintains any arbitrary opening angle of the door 14 even after a person lets go of the door 14 after opening it to the arbitrary angle. The slowdown function is a function that allows the stay to slowly close the door 14. When the internal frictional force of the stay is increased, the free-stop function is obtained, and when the internal frictional force of the stay is decreased, the slowdown function is obtained.

The door 14 is connected to the top of the main body 13 through a hinge 17 such that the door 14 can rotate around the horizontal rotation axis. As the hinge 17, a uniaxial hinge having constant instantaneous center may be used, or a slide hinge where the instantaneous center moves may be used. FIG. 1 shows an example of a hinge 17 provided at a top part of a main body 13 such that the door 14 opens upward, but the hinge 17 may also be provided at the bottom of the door 14 such that the door 14 opens downward.

Figure 2A:
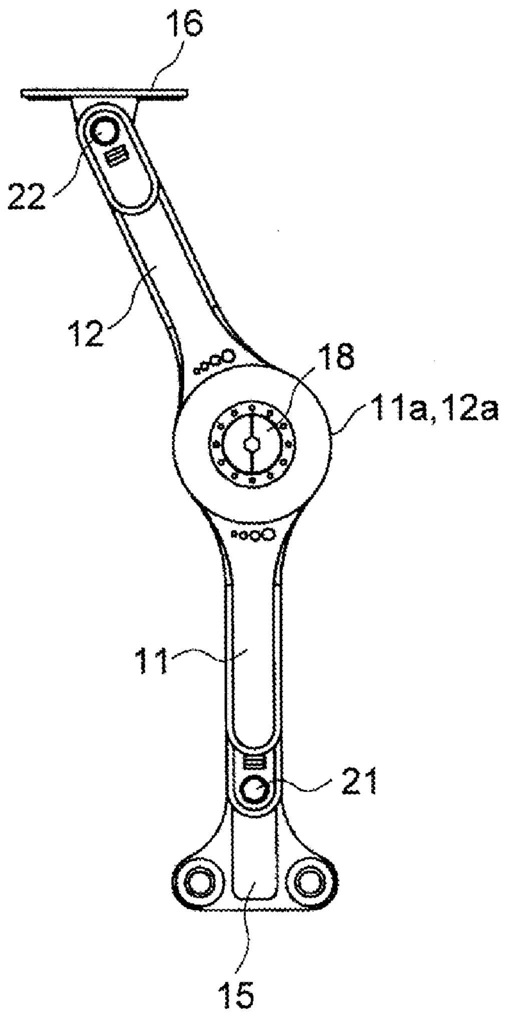
FIGS. 2A and 2B illustrate an external view of a stay according to the embodiments of the present embodiment.
Figure 2B:
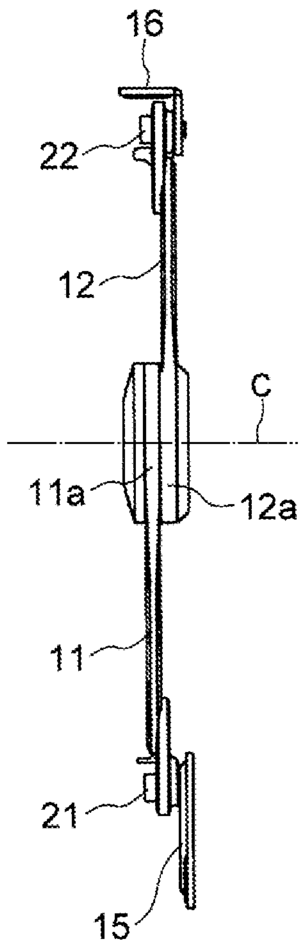

FIGS. 2A and 2B show an external view of the stay. FIG. 2A is a front view of the stay, and FIG. 2B is a side view of the stay. The stay is provided with a first arm 11 and a second arm connected so as to be capable of rotating with each other around a rotation axis. The first arm 11 and the second arm 12 have respective disk shaped connection parts 11*a* and 12*a* at the connection side ends, and are connected by the connection parts 11*a* and 12*a* so as to be capable of mutual rotation. The center of the connection parts 11*a* and 12*a* becomes a rotation axis C of the stay. A resistance force adjusting screw 18 which adjusts the resistance force that is generated when the first arm 11 and the second arm 12 rotate is provided at the connection part 11*a*. For example, when the resistance force adjusting screw 18 is turned clockwise, the resistance force is increased, and when it is turned counterclockwise, the resistance force is decreased. The washer 15 attached to the main body 13 is attached to the free end of the first arm 11 such that it is capable of rotating around a shaft body 21. The washer 16 attached to the door 14 is attached to the free end of the second arm 12 so as to be capable of rotating around a shaft body 22. The rotation axis C and the shaft bodies 21 and 22 are mutually parallel.

When the door 14 is opened and closed, the first arm 11 and the second arm 12 rotate simultaneously around the rotation axis C. In other words, the second arm 12 rotates relatively with respect to the first arm 11. For the sake of explanatory convenience, hereinafter it will be assumed that the rotation of the first arm 11 is fixed, and that the second arm 12 rotates.

Figure 3:
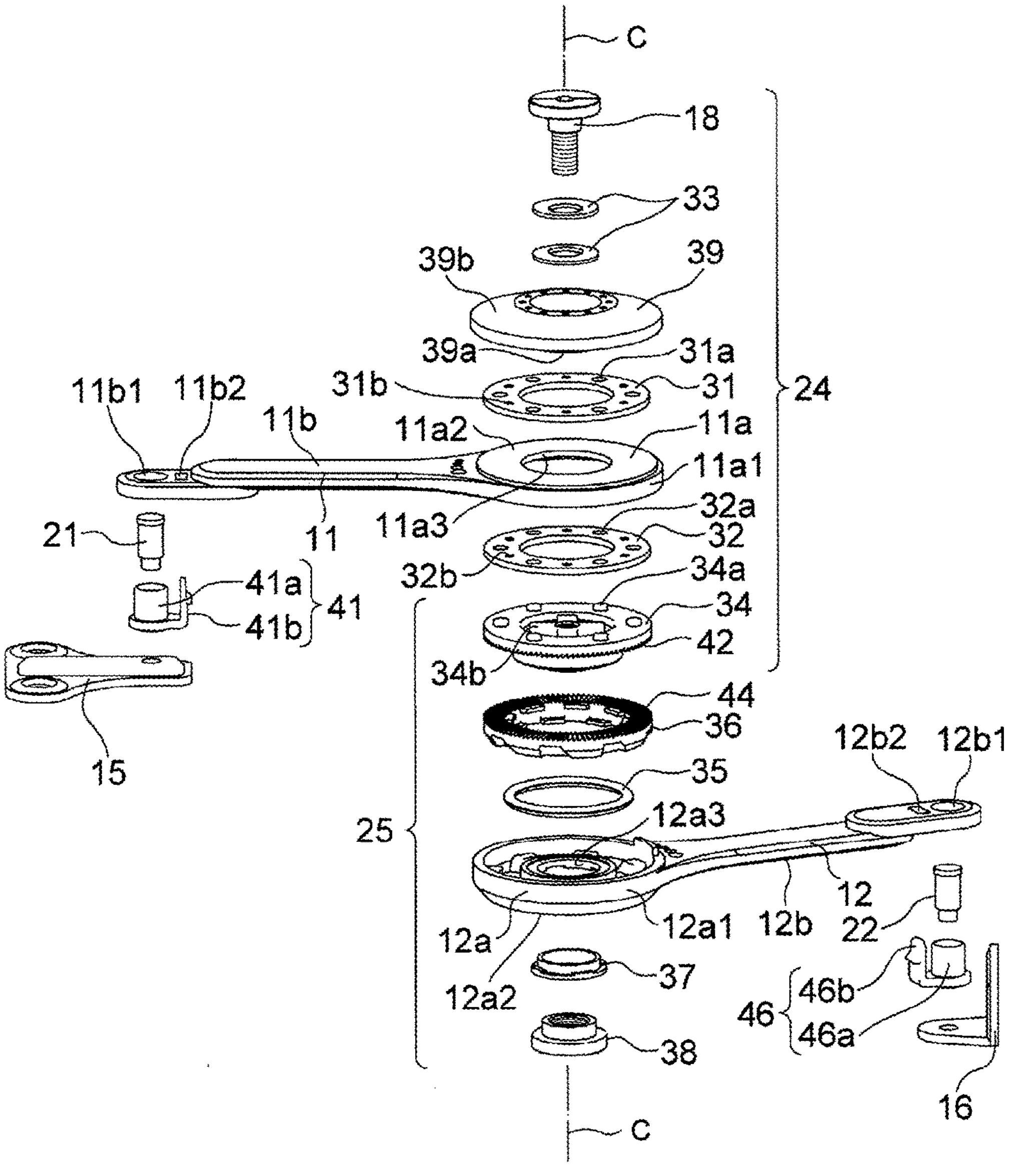
FIG. 3 is an exploded perspective view (as viewed from the top) of the stay of the present embodiment.
Figure 4:
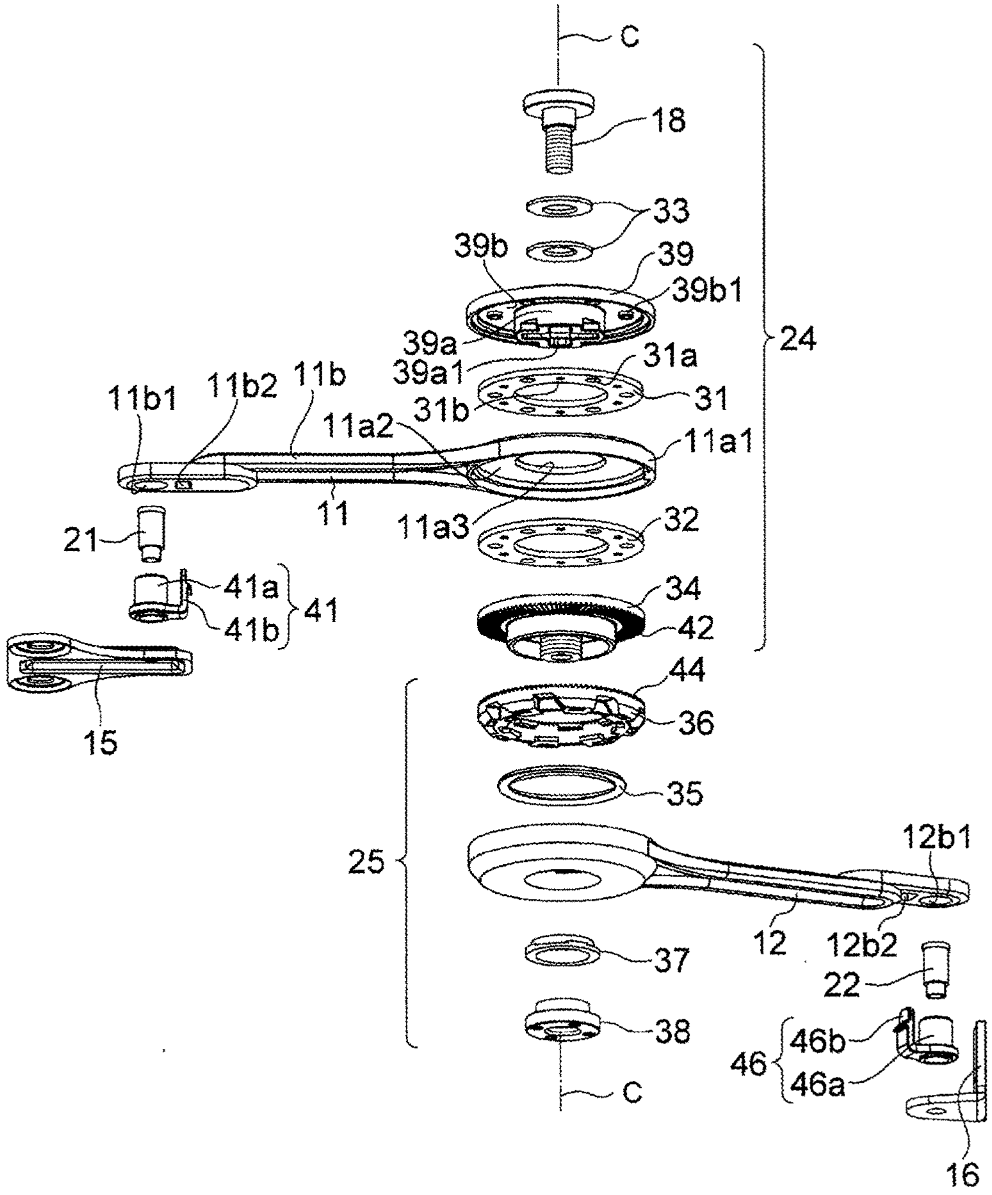
FIG. 4 is an exploded perspective view (as viewed from the bottom) of the stay of the present embodiment.

FIGS. 3 and 4 illustrate exploded perspective views of the stay. FIG. 3 shows an exploded perspective view of the stay as seen from the top, and FIG. 4 shows an exploded perspective view as seen from the bottom. The stay is provided with a frictional force generation mechanism 24 which generates frictional force, and a torque transmission mechanism 25 which transmits torque. The frictional force generation mechanism 24 presses friction plates 31 and 32 against the first arm 11 to generate frictional force. A disk 34 is joined to the first arm 11 via the friction plate 32, and is joined to the first arm 11 by frictional force of the friction plate 32.

The torque transmission mechanism 25 meshes the disk 34 and a cam base 36, cancels the meshing, transmits torque of the second arm 12 to the first arm 11, and cancels the transmission thereof. When the disk 34 and the cam base 36 are meshed, the torque of the second arm 12 is transmitted through the disk 34 and the friction plates 31 and 32 to the first arm 11. When the torque of the second arm 12 is larger than the torque attributed to the frictional force of the friction plates 31 and 32, the second arm 12, the disk 34, the cam base 36 and the friction plates 31 and 32 rotate in an integrated manner with resistance force with respect to the first arm 11.

When the meshing of the disk 34 and the cam base 36 is cancelled, the torque of the second arm 12 is not transmitted to the first arm 11, and the second arm 12 and the cam base 36 rotate freely in an integrated manner with respect to the first arm 11 and the disk 34.

The configuration of each part of the stay is as follows. The first arm 11 is provided with a disk shaped connection part 11*a* and a lever unit 11*b* protruding in the radial direction from the connection part 11*a*. The disk shaped connection part 11*a* is provided with a circumferential ring-shaped crown 11*a*1 and a ring-shaped ring plate 11*a*2 provided at the inside of the crown 11*a*1. A through-hole 11*a*3 is opened at the center of the ring plate 11*a*2. A disk-shaped mating part 39*a* (see FIG. 4) of a lid member 39 fits into the through-hole 11*a*3. The rotation of the first arm 11 is guided by the mating part 39*a* of the lid member 39.

The washer 15 is attached in a rotatable manner via the shaft body 21 and a connector 41 to the free end of the lever unit 11*b*. The shaft body 21 is crimped and fixed to the washer 15. The connector 41 is fitted onto the shaft body 21 so as to be capable of rotating around the perimeter of the shaft body 21. The free end of the lever unit 11*b* is connected to the connector 41 so as to be capable of being attached and detached. The shaft body 21 and the washer 15 are made of metal, and the connector 41 rotates with respect to the shaft body 21 and the washer 15 which are integrally connected by crimping and fixing.

The connector 41 is provided with a cylindrical mating part 41*a* in which the shaft body 21 fits, and a flexible part 41*b* which projects sideways from the mating part 41*a* and then bends in an L-shape. The free end of the lever unit 11*b* is connected to the connector 41 so as to be attachable and detachable. A circular first hole 11*b*1 and a square shaped second hole 11*b*2 are opened at the free end of the lever unit 11*b*. The second hole 11*b*2 is positioned further to the rotation axis C side than the first hole 11*b*1, or in other words, is positioned further to the inside. The mating part 41*a* of the connector 41 is inserted into the first hole 11*b*1, and the flexible part 41*b* of the connector 41 is passed into the second hole 11*b*2.

The disk-shaped ring plate 11*a*2 of the first arm 11 is sandwiched between the pair of friction plates 31 and 32. The friction plates 31 and 32 are formed in a ring shape so that the mating part 39*a* of the lid member 39 can be inserted. The lid member 39 and the disk 34 are connected so as to be incapable of relative rotation, and the pair of friction plates 31 and 32 is sandwiched therebetween so as also to be incapable of relative rotation. A hole in which the mating part 39*a* of the lid member 39 is fitted is opened in the center of the friction plate 31. A plurality of holes 31*a* in which a plurality of projections 39*b*1 of the lid member 39 fit are opened in the friction plate 31 in the circumferential direction. Pockets 31*b* for storing lubricating oil are formed between the holes 31*a*. A plurality of holes 32*a* in which projections 34*a* of the disk 34 fit are opened in the friction plate 32 in the circumferential direction, and pockets 32*b* for storing lubricating oil are formed between the holes 32*a*.

The lid member 39 is provided with a closed disk 39*b* which covers the ring plate 11*a*2 of the first arm 11, and a disk-shaped mating part 39*a* which projects from the closed disk 39*b* (see FIG. 4). Projections 39*b*1 which fit in the holes 31*a* of the friction plate 31 are formed at the closed disk 39*b*. A cross-shaped concave part 39*a*1 is formed at the mating part 39*a*, and when a cross-shaped convex part 34*b* of the disk 34 (see FIG. 3) is fitted into the cross-shaped concave part 39*a*1 of the mating part 39*a*, the lid member 39 is connected to the disk 34 in a manner that prevents rotation.

Figure 5:
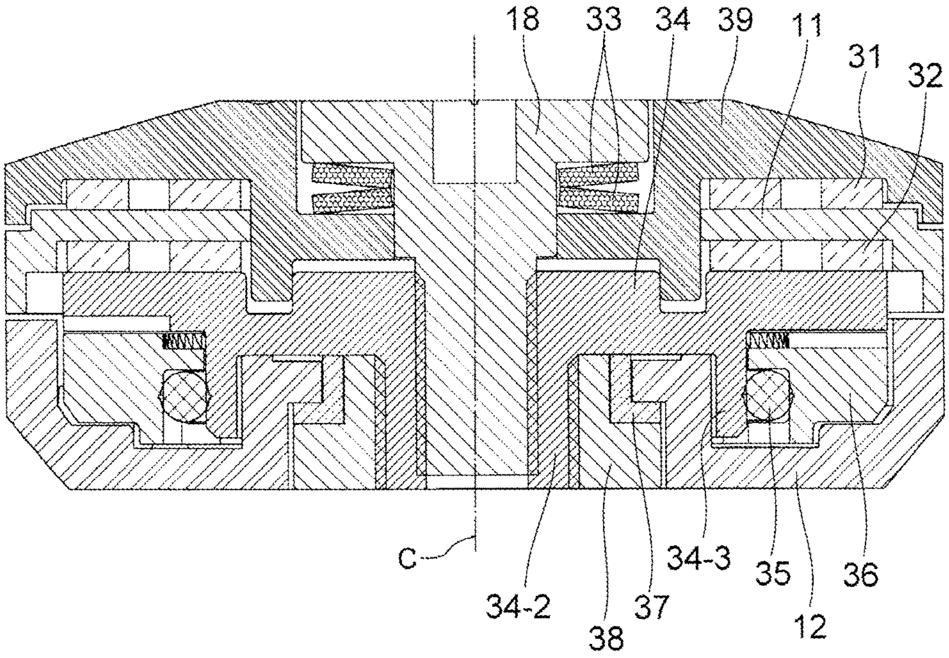
FIG. 5 is a cross-sectional view of the stay of the present embodiment.

As shown by the cross-sectional view of FIG. 5, the resistance force adjusting screw 18 is screwed into the disk 34. A disk spring 33 is interposed as an elastic member between the resistance force adjusting screw 18 and the lid member 39. When the closing state of the resistance force adjusting screw 18 is adjusted, the force of the friction plates 31 and 32 pressing on the first arm 11 is adjusted.

Figure 6A:
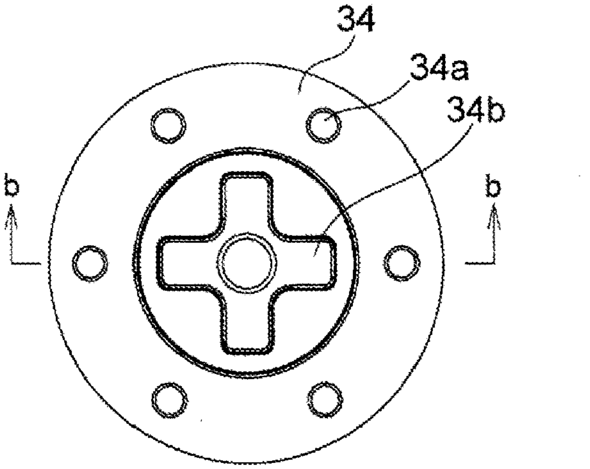
FIGS. 6A through 6D represent a detailed view of a disk incorporated in a stay of the present embodiment.
Figure 6B:
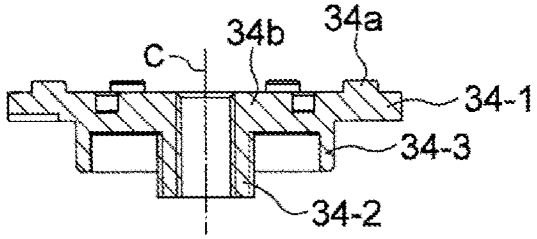
Figure 6C:
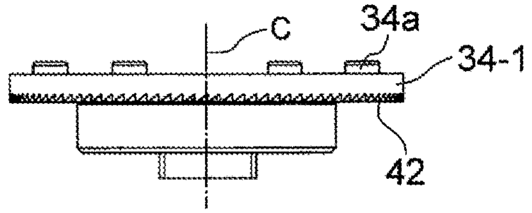
Figure 6D:
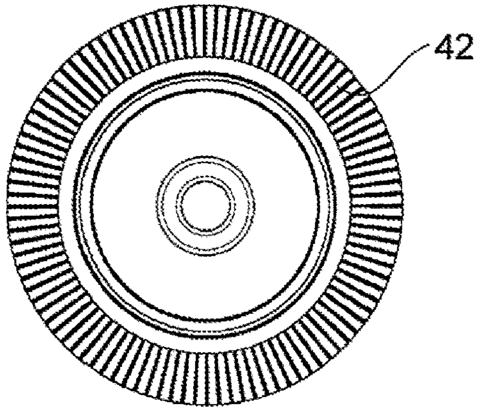

FIGS. 6A through 6D illustrate a detailed view of the disk 34. The disk 34 is provided with a disk-shaped main body 34-1, a cylindrical threaded part 34-2 projecting from the center of the main body 34-1 in the rotation axis C direction, and a cylindrical guide part 34-3 positioned at the outside of the threaded part 34-2. A plurality of projections 34*a* which fit into the holes 32*a* of the friction plate 32 are provided in the circumferential direction at the top surface of the cylindrical main body 34-1. A plurality of teeth 42 are formed at the bottom surface of the main body 34-1, and the teeth 42 are aligned in a ring shape around the circumference of the rotation axis C. As shown by the enlarged view of FIG. 9B, the lateral face of the teeth 42 is formed in a triangular shape. The teeth 42 are provided with a first surface 42*a* positioned in a vertical plane that includes the rotation axis C, and a second surface 42*b* which is inclined with respect to the first surface 42*a*. As shown in FIG. 6D, the teeth traces of the teeth 42 extend in a radiating direction.

As shown in FIG. 6B, a screw is formed at the inside and the outside of the cylindrical threaded part 34-2, and as shown in FIG. 5, the resistance force adjusting screw 18 is screwed into the inside of the threaded part 34-2. A collar 38 that fixes a bearing 37 is screwed into the outside of the threaded part 34-2. The bearing 37 is a slide bearing, and supports the rotation of the second arm 12 around the rotation axis C.

As shown in FIG. 5, the cam base 36 is fitted onto the cylindrical guide part 34-3. The cam base 36 is capable of moving in the direction of the rotation axis C along the cylindrical guide part 34-3 of the disk 34. A resin ring 35 (O-ring) is provided as a position retention means between the guide part 34-3 of the disk 34 and the cam base 36. The resin ring 35 is supported by the cam base 36. The inner perimeter of the resin ring 35 contacts the guide part 34-3 of the disk 34. The resin ring 35 allows the cam base 36 to move in the direction of the rotation axis C with respect to the disk 34, and temporarily maintains the position of the cam base 36 in the rotation axis C direction. Moreover, the resin ring 35 thereof allows the cam base 36 to rotate around the rotation axis C.

Figure 7A:
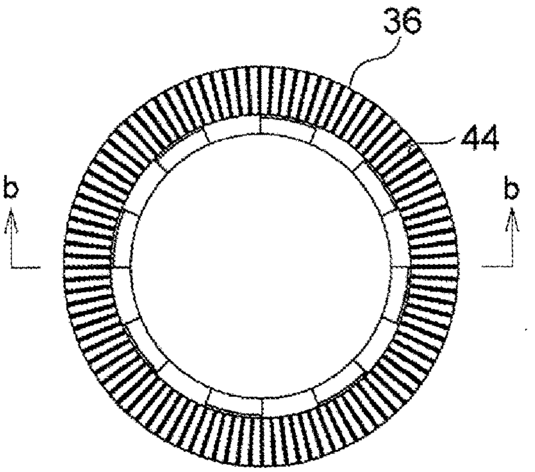
FIGS. 7A through 7D represent a detailed view of a cam base incorporated in a stay of the present embodiment.
Figure 7B:
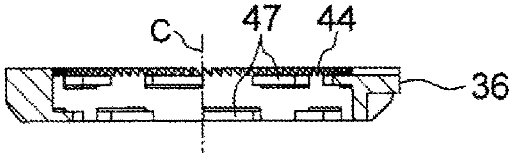

FIGS. 7A through 7D illustrate a detailed view of the cam base 36. The cam base 36 is formed in a ring shape, and a plurality of teeth 44 is formed at the surface of the cam base 36 that opposes the disk 34. The teeth 44 thereof mesh with the teeth 42 of the disk 34. The teeth 44 are aligned in a ring shape around the perimeter of the rotation axis C, and as shown by the enlarged view of FIG. 9B, the lateral face of the teeth is formed in a triangle. The teeth 44 are provided with a first surface 44*a* positioned in a vertical plane that includes the rotation axis C, and a second surface 44*b* which is inclined with respect to the first surface 44*a*. As shown in FIG. 7A, the teeth traces of the teeth 44 extend in a radiating direction, and as shown in FIG. 7B, protrusions 47 which support the resin ring 35 are formed at the inner perimeter surface of the cam base 36.

Figure 7C:
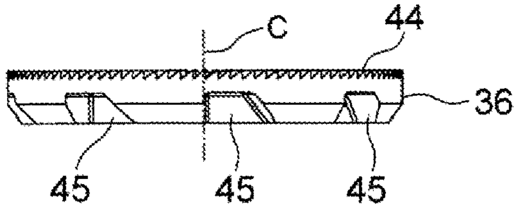
Figure 7D:
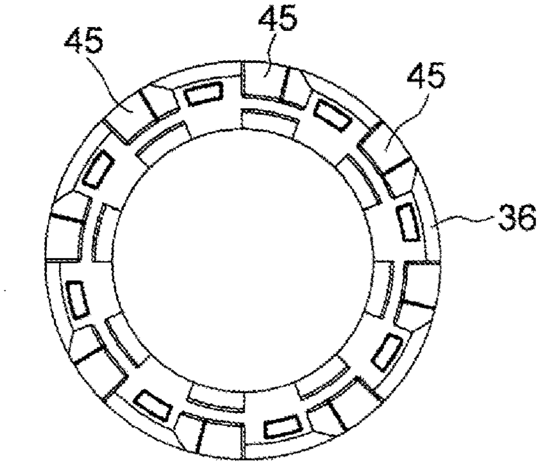

As shown in FIG. 7C, concave parts 45 which function as a cam are formed at the surface of the cam base 36 that opposes the second arm 12. A plurality of concave parts 45 are provided in the circumferential direction, and as shown in the enlarged view of FIG. 9A, the lateral face of the concave part 45 is formed in a square shape. The concave part 45 is provided with a vertical surface 45*a* positioned in a vertical plane that includes the rotation axis C, and an inclined surface 45*b* which is opposite to the vertical surface 45*a* and is inclined with respect to the vertical surface 45*a*.

As shown in FIG. 3, the second arm 12 is provided with a disk-shaped connection part 12*a*, and a lever unit 12*b* protruding from the connection part 12*a* in a radial direction. The disk shaped connection part 12*a* is provided with a circumferential ring-shaped crown 12*a*1 and a ring-shaped ring plate 12*a*2 provided at the inside of the crown 12*a*1. A through-hole 12*a*3 is opened at the center of the ring plate 12*a*2, and the bearing 37 fits into the through-hole 12*a*3.

The washer 16 is attached in a rotatable manner via the shaft body 22 and a connector 46 to the free end of the lever unit 12*b*. The shaft body 22 is crimped and fixed to the washer 16. The connector 46 is fitted onto the shaft body 22 so as to be capable of rotating around the perimeter of the shaft body 22. The free end of the lever unit 12*b* is connected to the connector 46 so as to be capable of being attached and detached, and the connector 46 rotates with respect to the shaft body 22 and the washer 16 which are integrally connected by crimping and fixing.

The connector 46 is provided with a cylindrical mating part 46*a* in which the shaft body 22 fits, and a flexible part 46*b* which projects sideways from the mating part 46*a* and then bends in an L-shape. The free end of the lever unit 12*b* is connected to the connector 46 so as to be attachable and detachable. A circular first hole 12*b*1 and a square shaped second hole 12*b*2 are opened at the free end of the lever unit 12*b*. The second hole 12*b*2 is positioned further to the rotation axis C side than the first hole 12*b*1, or in other words, is positioned further to the inside. The mating part 46*a* of the connector 46 is inserted into the first hole 12*b*1, and the flexible part 46*b* of the connector 46 is passed into the second hole 12*b*2.

Figure 8:
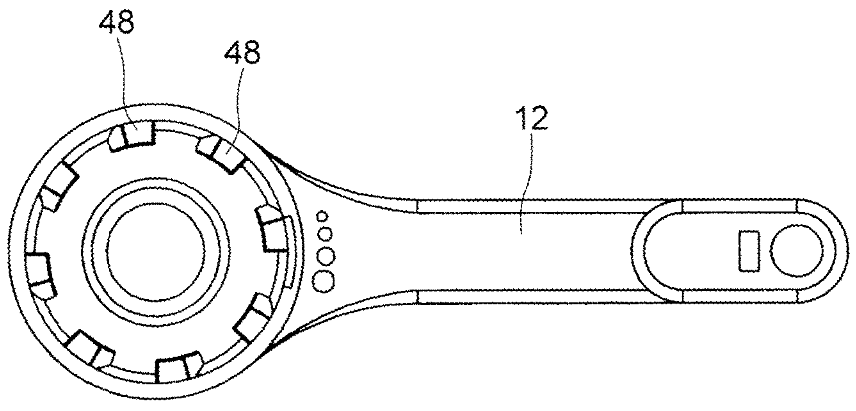
FIG. 8 is a plan view of a second arm incorporated in a stay of the present embodiment.

As shown by the plan view of the second arm 12 of FIG. 8, a plurality of convex parts 48 which function as a cam are formed at the surface of the second arm 12 that opposes the cam base 36. The plurality of convex parts 48 of the second arm 12 fit with the plurality of concave parts of the cam base 36, and when the second arm 12 rotates around the rotation axis C, the cam base 36 moves in the direction of the rotation axis C through the cam action. As shown in the enlarged view of FIG. 9A, the lateral face of the convex part 48 is formed in a square shape, and the convex part 48 is provided with a vertical surface 48*a* positioned in a vertical plane that includes the rotation axis C, and an inclined surface 48*b* which is opposite to the vertical surface 48*a* and is inclined with respect to the vertical surface 48*a*.

Figure 9A:
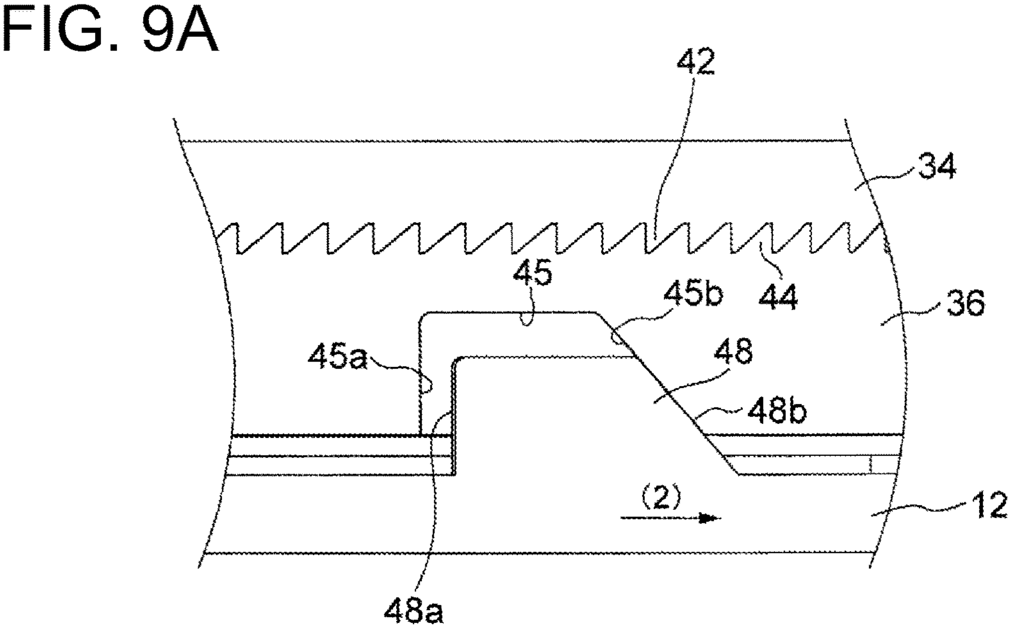
FIGS. 9A and 9B represent a detailed view of the disk, the cam base, and the second arm.
Figure 9B:
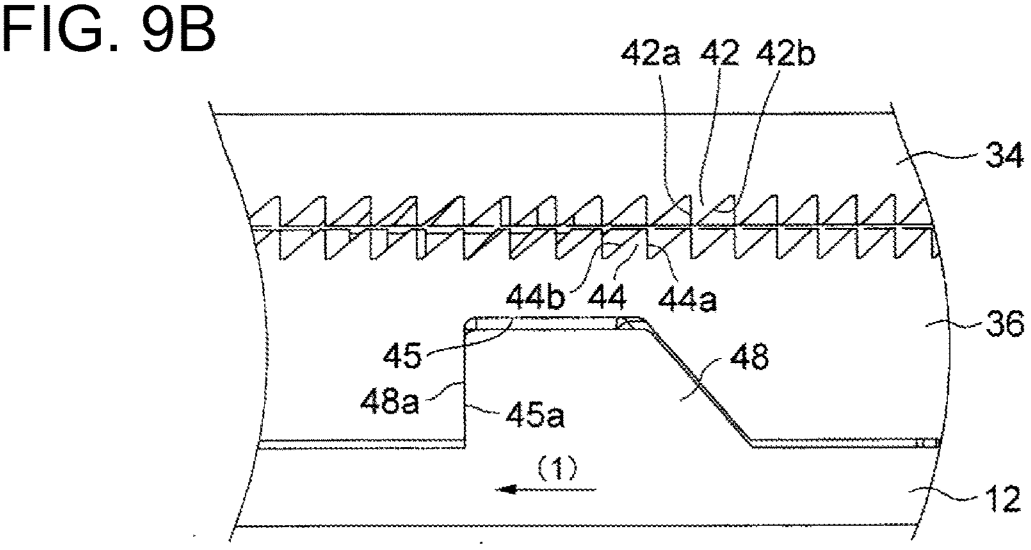

FIGS. 9A and 9B illustrate a detailed view of meshing between the disk 34, the cam base 36 and the second arm 12. FIG. 9A shows a state where the second arm 12 is rotated in the other direction (2), and FIG. 9B shows a state where the second arm 12 is rotated with respect to the first arm 11 in a first direction (1).

As shown in FIG. 9A, when the second arm 12 is rotated to the other direction (2), the inclined surface 48*b* of the convex part 48 of the second arm 12 contacts the inclined surface 45*b* of the concave part 45 of the cam base 36. When this occurs, based on the cam principle, the cam base 36 moves towards the disk 34 in the direction of the rotation axis C, and ultimately, the teeth 44 of the cam base 36 mesh with the teeth 42 of the disk 34. Even when the teeth 44 of the cam base 36 are in a state of being meshed with the teeth 42 of the disk 34, the convex part 48 of the cam base 36 remains fitted with the concave part 45 of the disk 34. Therefore, when the second arm 12 is rotated in the other direction (2), the second arm 12, the cam base 36 and the disk 34 rotate in the other direction (2) in an integrated manner. At this time, the friction plates 31 and 32 also rotate in the other direction (2), and resistance force is generated.

As shown in FIG. 9B, when the second arm 12 is rotated in the first direction (1), the vertical surface 48*a* of the convex part 48 of the second arm 12 contacts the vertical surface 45*a* of the concave part 45 of the cam base 36. Therefore, the second arm 12 and the cam base 36 rotate in the first direction (1) in an integrated manner. As shown in FIG. 9A, the teeth 44 of the cam base 36 are meshed with the teeth 42 of the disk 34, and therefore, through the cam principle involving the second surface 44*b* of the teeth 44 and the second surface 42*b* of the teeth 42, the cam base 36 moves in a direction away from the disk 34. Here, the vertical surface 48*a* of the convex parts 48 and the vertical surface 45*a* of the concave part 45 allow movement of the cam base 36 in a direction away from the disk 34. When the cam base 36 moves away from the disk 34, the second arm 12 and the cam base 36 rotate freely in the first direction (1). When the cam base 36 is moved away from the disk 34, the resin ring 35 maintains the position thereof.

Figure 10:
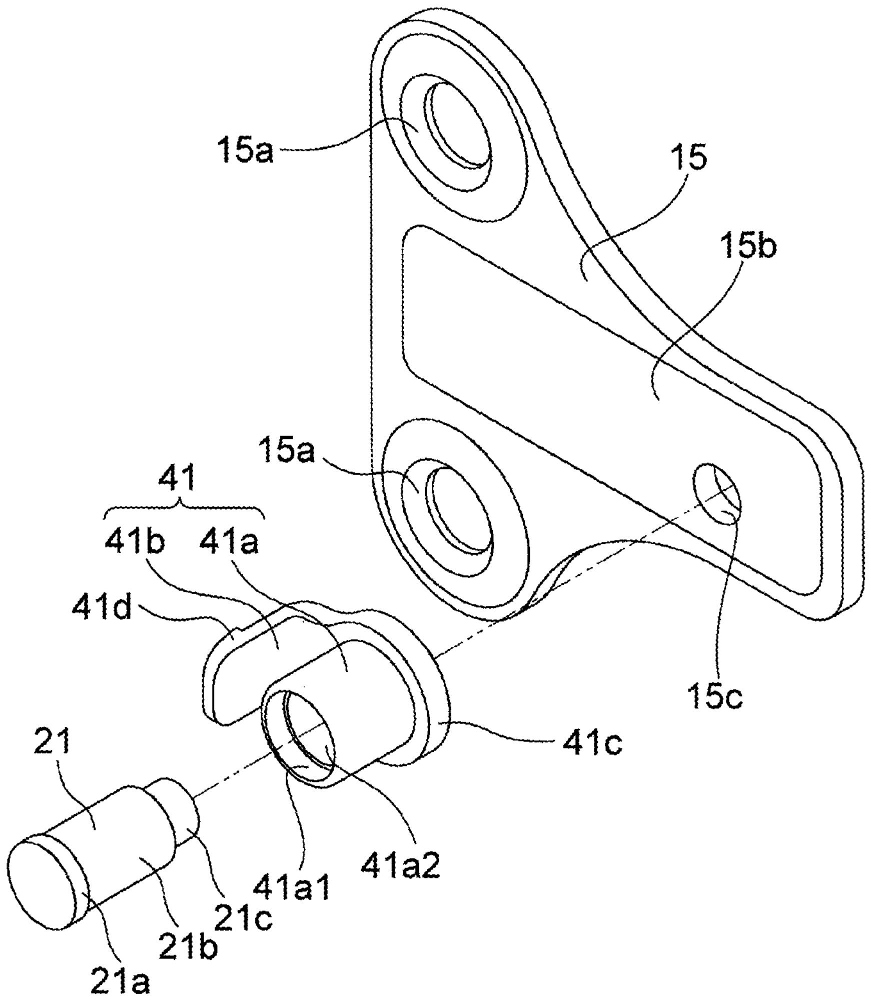
FIG. 10 is an exploded perspective view of a washer, a connector, and a shaft body.
Figure 11:
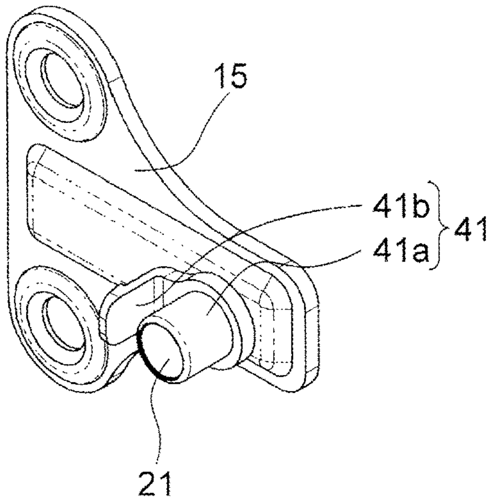
FIG. 11 is a perspective view of the washer, the connector, and the shaft body in an assembled state.
Figure 12A:
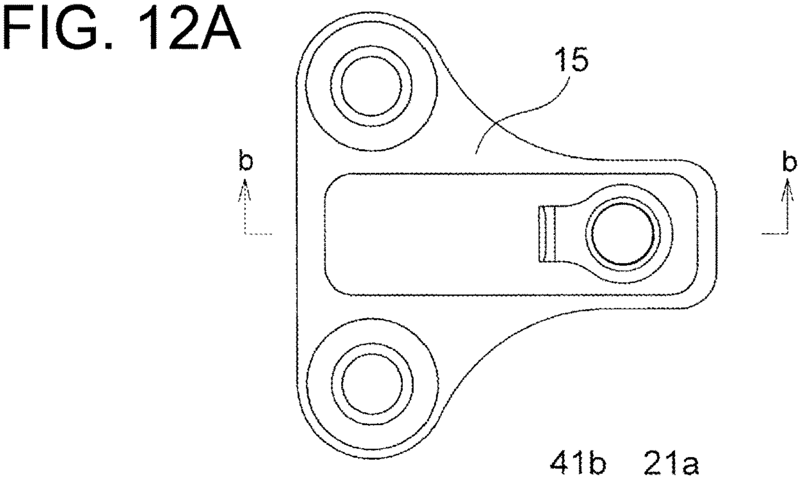
FIGS. 12A and 12B represent a detailed view of the washer, the connector, and the shaft body in an assembled state.
Figure 12B:
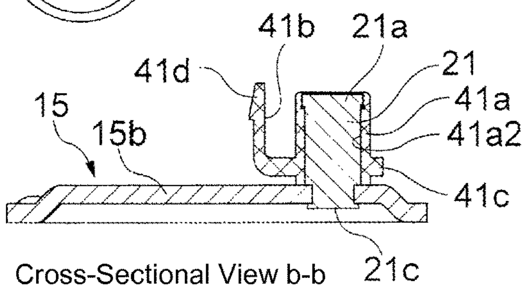

FIG. 10 to FIGS. 12A and 12B illustrate detailed views of the washer 15, connector 41 and shaft body 21 attached to the free end of the first arm 11. FIG. 10 shows an exploded perspective view, FIG. 11 shows a perspective view of an assembled state, and FIGS. 12A and 12B illustrate a detailed view. As described above, the shaft body 21 is crimped and fixed to the washer 15. The connector 41 is supported by the integrally connected shaft body 21 and washer 15 so as to be rotatable around the rotation axis.

As shown in FIG. 10, the washer 15 thereof is formed in a triangular plate shape, and a plurality of attachment holes 15*a* are opened in the washer 15. When the washer 15 is attached to a main body 13 of a cabinet, screws are passed through the attachment holes 15*a*. A center part 15*b* of the washer 15 is raised such that the back surface of the center part 15*b* does not contact the main body 13 of the cabinet (see FIG. 12B). A through-hole 15*c* through which a crimping part 21*c* at the tip end side of the shaft body 21 is passed is opened at the center part 15*b* of the washer 15.

As shown in FIG. 10, the shaft body 21 is provided with a large diameter retaining part 21*a* at the base end side, a guide part 21*b* at the center, and a crimping part 21*c* at the tip end side. The cross-sectional shapes of the retaining part 21*a*, the guide part 21*b* and the crimping part 21*c* are all circular. After the shaft body 21 is inserted into the mating part 41*a* of the connector 41, the crimping part 21*c* of the shaft body 21 is crimped and fixed to the washer 15 (see FIG. 12B).

As shown in FIG. 10, the connector 41 is provided with the cylindrical mating part 41*a* in which the shaft body 21 fits and the flexible part 41*b* that projects sideways from the mating part 41*a*. The mating part 41*a* is provided with a large diameter part 41*a*1 that corresponds with the retaining part 21*a* of the shaft body 21, and a sliding part 41*a*2 having a smaller diameter than the retaining part 21*a* of the shaft body 21 and corresponding to the guide part 21*b* of the shaft body 21. The inner diameter of the sliding part 41*a*2 is smaller than the outer diameter of the retaining part 21*a* of the shaft body 21, and therefore the connector 41 cannot be removed from the shaft body 21. As shown in FIG. 10, a flange 41*c* which projects in the radial direction is formed at the mating part 41*a*. The flexible part 41*b* projects in the radial direction from a part of the circumferential direction of the flange 41*c*, bends at 90 degrees, and then extends in the direction of the rotation axis C. As shown in FIG. 12B, a hook 41*d* is provided at the tip of the flexible part 41*b*. The hook 41*d* is provided at the side of the tip of the flexible part 41*b* that is separated from the mating part 41*a*. The cross-section of the hook 41*d* is formed in a triangular shape that tapers toward the tip. The flexible part 41*b* can bend like a plate spring centered on the base end part.

Figure 13A:
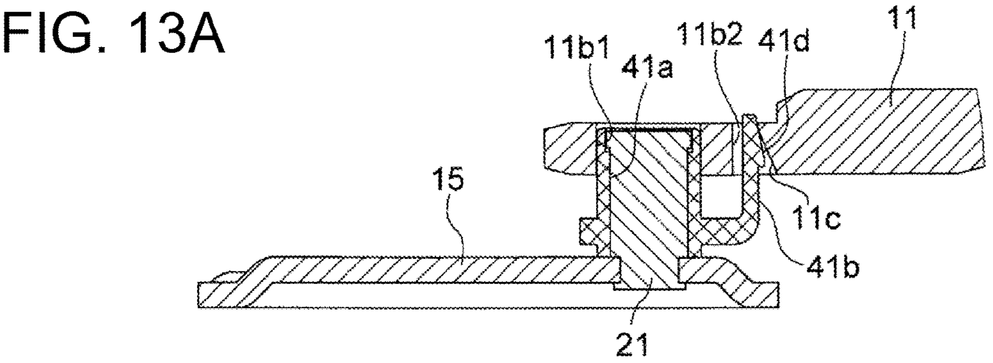
FIGS. 13A through 13C illustrate an exemplary embodiment of a process for attaching the first arm to the connector.
Figure 13B:
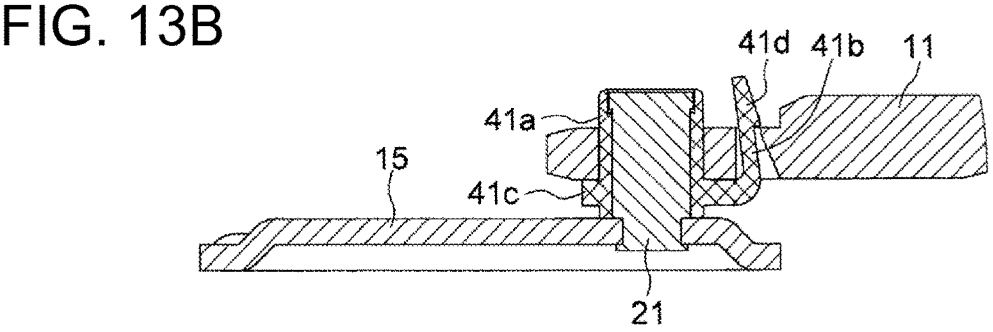

FIGS. 13A through 13B show a process of attaching the first arm 11 to the connector 41, and as shown in FIG. 13A, the mating part 41*a* of the connector 41 is fitted into the circular first hole 11*b*1 of the first arm 11, and the flexible part 41*b* of the connector 41 is inserted into the square shaped second hole 11*b*2. In this state, the first arm 11 is pushed toward the washer 15. An inclined surface 11*c* which contacts the hook 41*d* of the flexible part 41*b* is formed at the second hole 11*b*2. The inclined surface 11*c* thereof is formed such that when the flexible part 41*b* of the connector 41 is passed through the second hole 11*b*2, the amount of bend of the flexible part 41*b* gradually increases.

As shown in FIG. 13B, if the first arm 11 is pressed toward the washer 15, as the amount of pressing in that direction is increased, the amount of bend of the flexible part 41*b* also increases. The amount of bend thereof becomes a maximum amount just before the first arm 11 contacts the flange 41*c* of the connector 41.

Figure 13C:
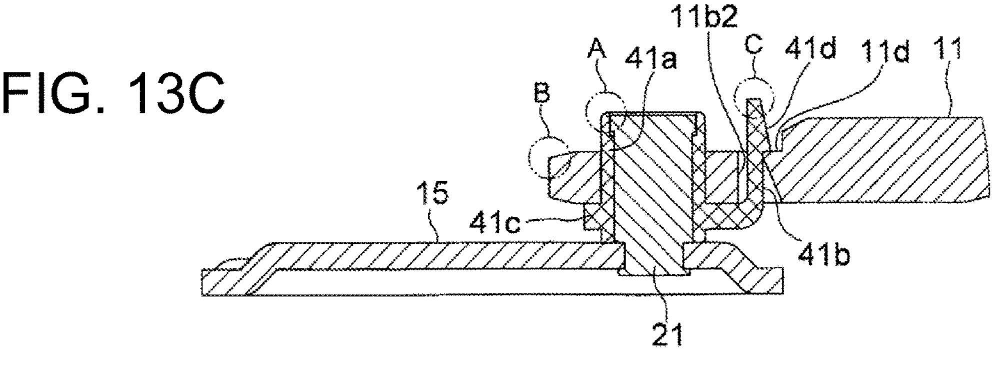

As shown in FIG. 13C, when the first arm 11 is pressed until it contacts the flange 41*c* of the connector 41, the hook 41*d* projects from the second hole 11*b*2, and the flexible part 41*b* is restored from a bent state to its original state. Moreover, of the circumferential wall part of the second hole 11*b*2, the area of the hook 41*d* that has a difference in surface levels engages with the wall part 11*d* of the side separated from the mating part 41*a*. Through this, the first arm 11 is prevented from coming out from the connector 41.

When removing the first arm 11 from the connector 41, the mating part 41*a* (or the free end of the first arm 11) can be supported and the flexible part 41*b* can be easily bent by pinching the mating part 41*a* of the connector 41 (or the free end of the first arm 11) and the flexible part 41*b* with, for example, the thumb and index finger (FIG. 13C→FIG. 13B). In FIG. 13C, the portions that are pinched by the fingers are enclosed by circles A, B and C. If the other hand is used to pull the stay with the flexible part 41*b* being bent and the hook 41*d* in a state of being removed from the first arm 11, the stay can be easily removed from the connector 41 (FIG. 13B→FIG. 13A).

Figure 14:
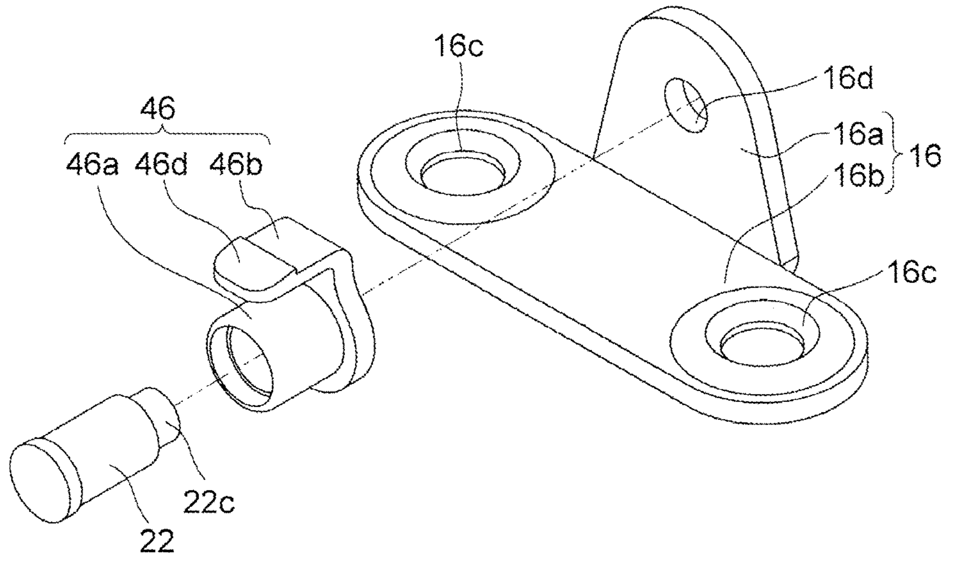
FIG. 14 is an exploded perspective view of a washer, a connector, and a shaft body.
Figure 15:
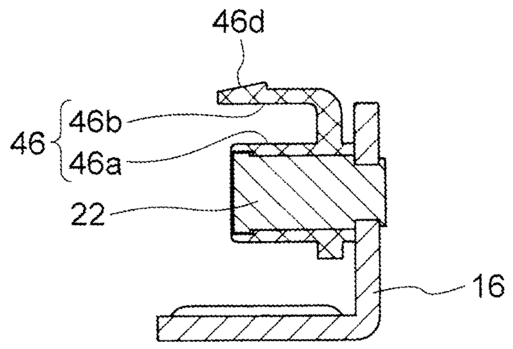
FIG. 15 is a cross-sectional view of the washer, the connector, and the shaft body in an assembled state.
Figure 16:
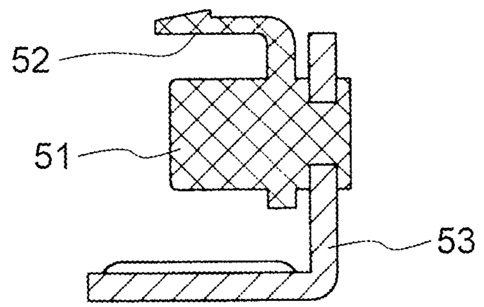
FIG. 16 is a cross-sectional view showing another example with the connector and the shaft body being integrated.
Figure 17:
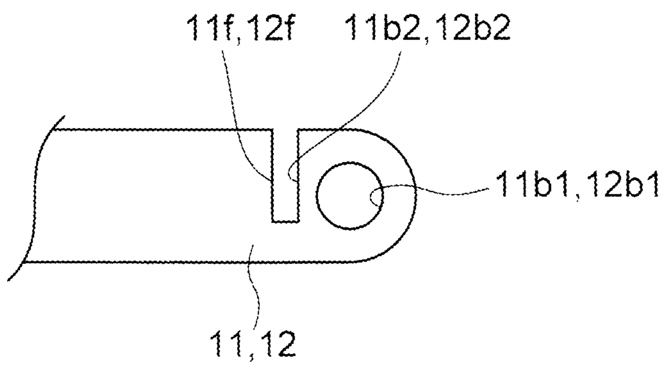
FIG. 17 is a plan view showing an example of a second hole opened in the first or the second arm.

FIGS. 14 and 15 illustrate detailed views of the washer 16, connector 46 and shaft body 22 attached to the free end of the second arm 12. FIG. 14 shows an exploded perspective view, and FIG. 15 shows a cross-sectional view of an assembled state. The shaft body 22 is crimped and fixed to the washer 16. The connector 46 is supported by the integrally connected shaft body 22 and washer 16 so as to be rotatable around the rotation axis C. The structures of the shaft body 22 and the connector 46 are the same as those of the shaft body 21 and connector 41 attached to the free end of the first arm 11, and therefore a description thereof is omitted.

As shown in FIG. 14, the washer 16 thereof is formed in a plate shape that is bent into an L-shape. A plurality of attachment holes 16*c* is opened in a base part 16*b* of the washer. A through-hole 16*d* through which passes a crimping part 22*c* at the tip end side of the shaft body 22 is opened in a connection piece 16*a* that is bent 90 degrees from the base part 16*b*. As shown in FIG. 1, the washer 16 thereof is attached to a door 14, and therefore the shaft body 22 must be attached to the connection piece 16*a* which contacts the door 14.

As shown in FIG. 15, the connector 46 is provided with a cylindrical mating part 46*a* in which the shaft body 22 fits, and a flexible part 46*b* that projects sideways from the mating part 46*a*. A hook 46*d* is provided at the tip end of the flexible part 46*b*. The hook 46*d* is provided at the side of the tip of the flexible part 46*b* that is separated from the mating part 46*a*. As shown in FIG. 3, the free end of the second arm 12 is connected to the connector 46 so as to be attachable and detachable. The mating part 46*a* of the connector 46 is fitted into the circular first hole 12*b*1 of the second arm 12, and the flexible part 46*b* of the connector 46 is inserted into the square shaped second hole 12*b*2. As described above, the second arm 12 can be easily attached to and removed from the connector 46.

Figure 18:
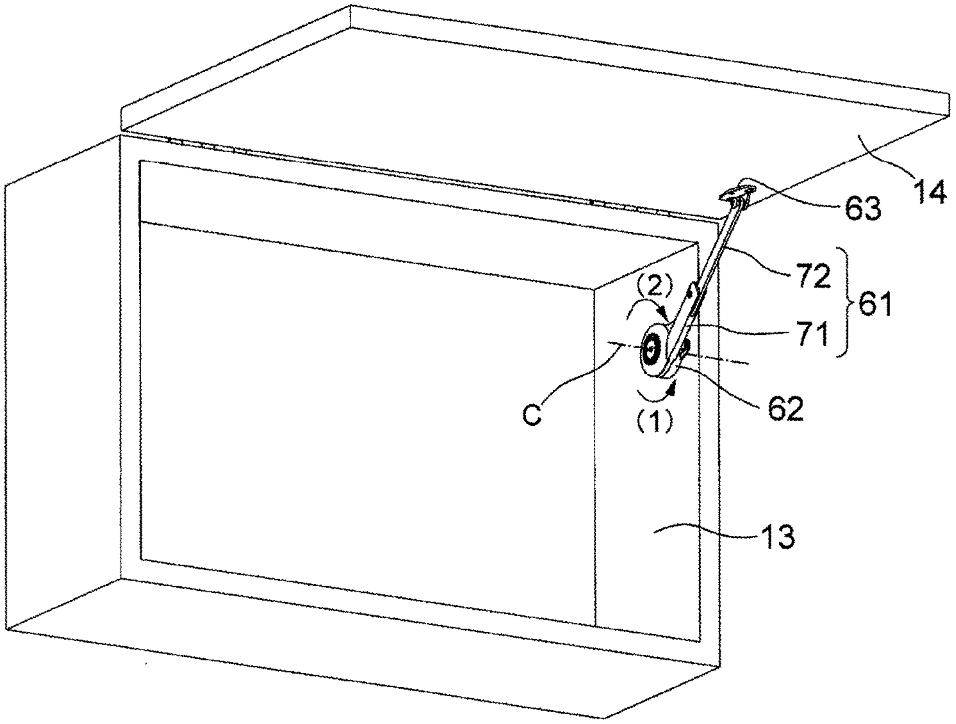
FIG. 18 is a perspective view showing an example of a stay of a second embodiment of the present invention used in an upward opening type cabinet.

A stay of a second embodiment of the present invention is described in detail below based on FIG. 18 to FIG. 23. FIG. 18 shows an example of a stay of the second embodiment used with an upward opening type cabinet.

First, an overview of the overall second embodiment is described. A stay of the present embodiment is provided with a stay main body 62 as a second member fixed to a main body 13 of a cabinet, and an arm 61 as a first member connected to the stay main body 62 so as to be capable of rotating around the rotation axis C. A free end, which is one end part of the arm 61 in the lengthwise direction, is attached to the door 14 via a washer 63 so as to be capable of rotation. The other end in the lengthwise direction of the arm 61 is rotatably connected to the stay main body 62. The arm 61 is capable of bending at a center part between the one end part and the other end, and is provided with a first link 71 and a second link 72, which are connected so as to be capable of mutually rotating.

Similar to the stay of the first embodiment, a friction damper is incorporated in the stay main body 62 of the present embodiment. Namely, when the door 14 is opened (when the arm 61 is rotated in the (1) direction with respect to the stay main body 62), the friction damper does not generate resistance force so that the door 14 can be opened with little force. On the other hand, when the door 14 is closed (when the arm 61 is rotated in the (2) direction with respect to the stay main body 62), the friction damper generates resistance force, thereby enabling a free-stop function or a slowdown function. The free-stop function is a function for which the stay maintains any arbitrary opening angle of the door 14 even after a person lets go of the door 14 after opening it to the arbitrary angle. The slowdown function is a function that allows the stay to slowly close the door 14. When the internal frictional force of the stay is increased, the free-stop function is obtained, and when the internal frictional force of the stay is decreased, the slowdown function is obtained.

The arm 61 of the stay of the second embodiment is further incorporated with a catch mechanism which maintains a closed door 14 at the closed position, and maintains an opened door 14 at the opened state. When the door 14 is in an opened state, the arm 61 is maintained in an extended state, and when the door 14 is in a closed state, the arm 61 is maintained at a bent state (see FIGS. 22A and 22B). The catch mechanism will be described later.

Note that with the stay of the first embodiment, both the first and the second arms 11 and 12 rotate when the door 14 is opened or closed, but with the stay of the second embodiment, the stay main body 62 is fixed to the main body 13, and only the arm 61 rotates. The stay main body 62 is fixed, but because the arm 61 rotates, it can be said that the stay main body 62 rotates relatively with respect to the arm 61.

Figure 19A:
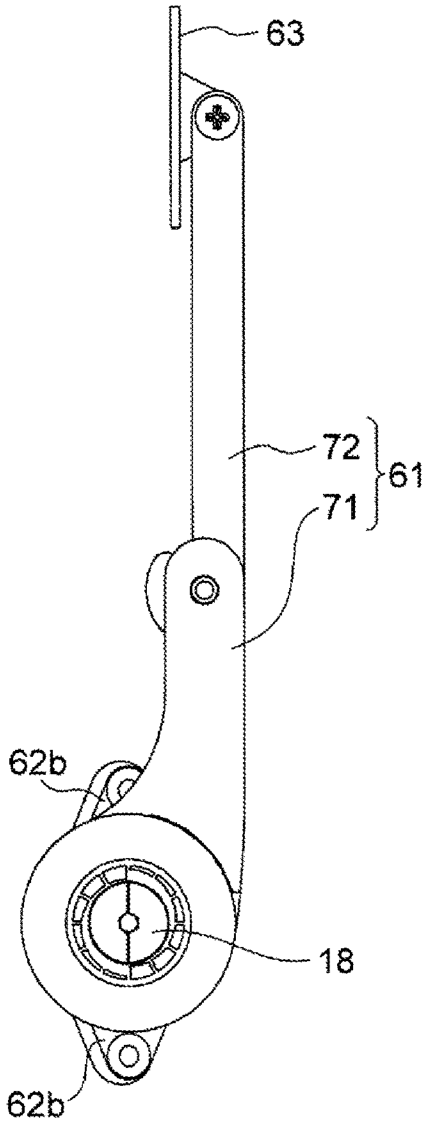
FIGS. 19A and 19B are an external view of the stay of the second embodiment.
Figure 19B:
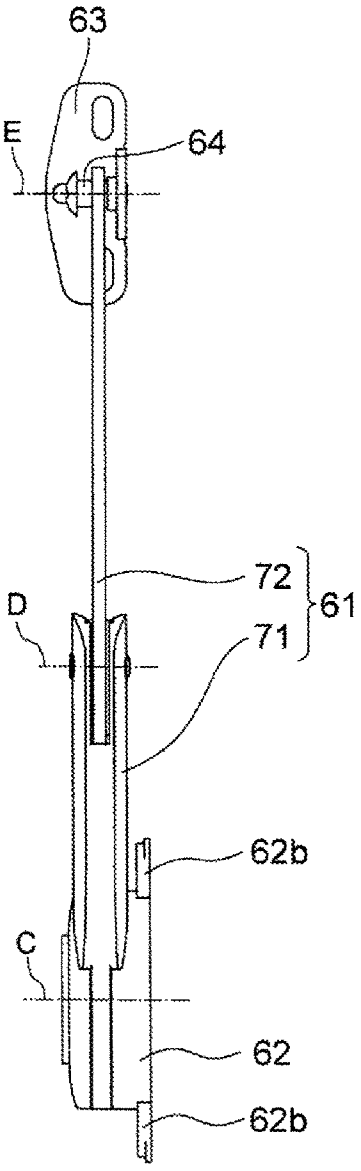

FIGS. 19A and 19B show an external view of the stay. FIG. 19A is a front view of the stay, and FIG. 19B is a side view of the stay. The stay is provided with the stay main body 62, and the arm 61 which is connected to the stay main body 62 so as to be capable of rotating around the rotation axis C. An attachment piece 62*b* is formed in an integrated manner with the stay main body 62, and the stay main body 62 is attached to the main body of the cabinet via the attachment piece 62*b*. A resistance force adjusting screw 18 which adjusts the resistance force that is generated when the arm 61 rotates is provided at the stay main body 62.

The arm 61 is provided with the first link 71 connected to the stay main body 62 so as to be capable of rotation, and with the second link 72 connected to the first link 71 so as to be rotatable. The free end of the second link 72 is connected to the washer 63 via a shaft body 64 so as to be capable of rotating, and the washer 63 is attached to the door 14 of the cabinet. The rotation axis C of the first link 71 with respect to the stay main body 62, a rotation axis D of the second link 72 with respect to the first link 71, and a rotation axis E of the second link 72 with respect to the washer 63 are mutually parallel.

Figure 20:
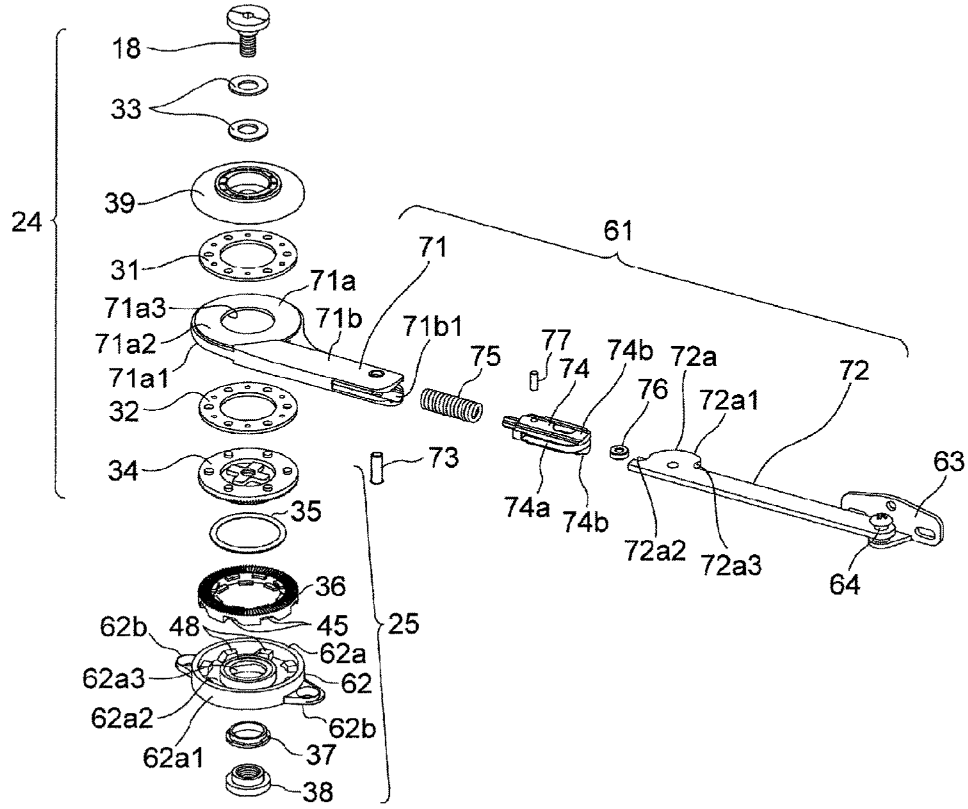
FIG. 20 is an exploded perspective view (as viewed from the top) of the stay of the second embodiment.
Figure 21:
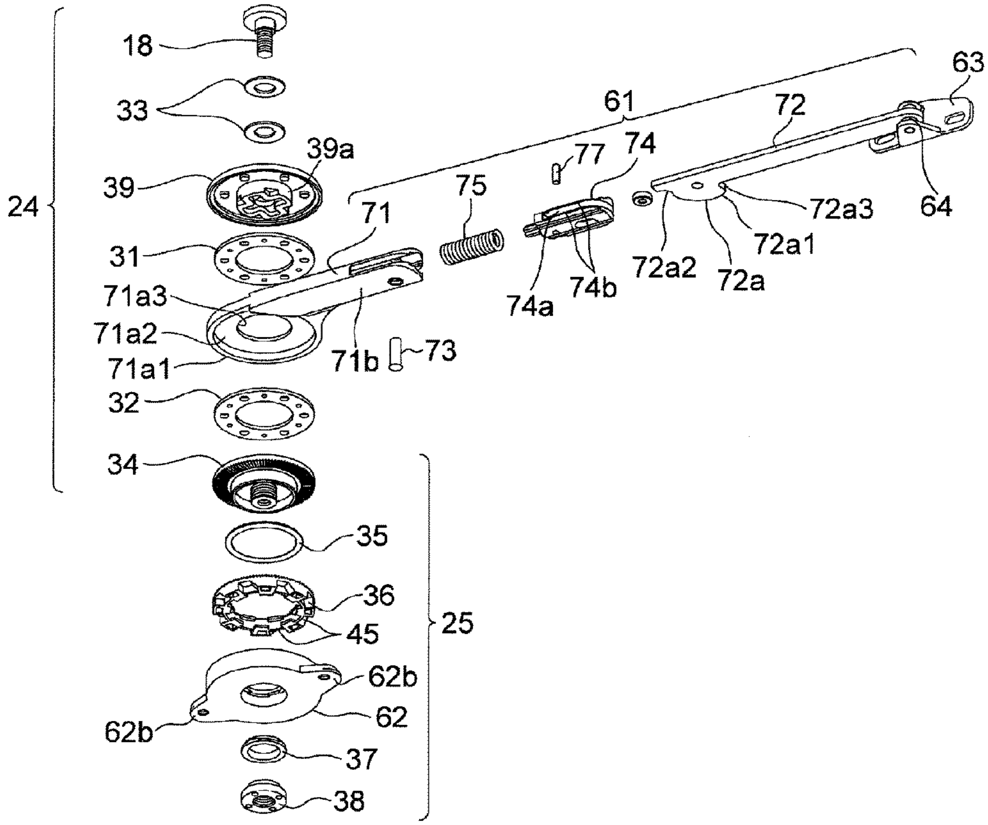
FIG. 21 is an exploded perspective view (as viewed from the bottom) of the stay of the second embodiment.

FIGS. 20 and 21 show exploded perspective views of the stay of the second embodiment. FIG. 20 shows an exploded perspective view of the stay as viewed from the top, and FIG. 21 shows an exploded perspective view of the stay as viewed from the bottom. Similar to the stay of the first embodiment, the stay of the second embodiment is also provided with a frictional force generation mechanism 24 for generating frictional force and a torque transmission mechanism 25 for transmitting torque.

The structure of the frictional force generation mechanism (friction plates 31 and 32, disk 34, lid member 39, resistance force adjusting screw 18 and disk spring 33) is the same as the structure of the frictional force generation mechanism 24 of the first embodiment, and therefore the same reference numerals are attached, and a description thereof is omitted. The frictional force generation mechanism 24 of the present embodiment also presses the friction plates 31 and 32 against the arm 61 to generate frictional force. The disk 34 is connected so as to be capable of rotating in an integrated manner with the friction plate 32, and is joined with the arm 61 through the frictional force of the friction plate 32.

The structure of the torque transmission mechanism 25 (disk 34, cam base 36, resin ring 35, bearing 37 and collar 38) is also the same as that of the torque transmission mechanism 25 of the first embodiment, and therefore the same reference numerals are attached, and a description thereof is omitted. The torque transmission mechanism 25 causes the disk 34 and the cam base 36 to mesh, cancels the meshing thereof, transmits the torque of the arm 61 to the stay main body 62, and cancels the transmission thereof.

When the disk 34 and the cam base 36 mesh, the torque of the arm 61 is transmitted to the stay main body 62 via the friction plates 31 and 32, the disk 34 and the cam base 36. Moreover, when the disk 34 and the cam base 36 are in a meshed state and the torque of the arm 61 is larger than the torque attributable to the frictional force of the friction plates 31 and 32, the arm 61 rotates with resistance force with respect to the friction plates 31 and 32. Through this, the free-stop function or the slowdown function is enabled.

When the meshing of the disk 34 and the cam base 36 is cancelled, the torque of the arm 61 is not transmitted to the stay main body 62, and the arm 61 rotates freely with respect to the stay main body 62. Through this, the door can be opened with minimal force.

The structures of the stay main body of the second embodiment and the arm 61 of the stay of the second embodiment are described in detail below. However, as mentioned above, the structures of the other parts are the same as those of the stay of the first embodiment, and therefore the same reference numerals are attached, and the descriptions thereof are omitted.

The stay main body 62 is provided with a disk-shaped connection part 62*a* and a pair of attachment pieces 62*b* which project from the connection part 62*a*. The disk-shaped connection part 62*a* is provided with a circumferential ring-shaped crown 62*a*1 and a ring-shaped ring plate 62*a*2 at the inside of the crown 62*a*1. A through-hole 62*a*3 is opened at the center of the ring plate 62*a*2, and a plurality of convex parts 48 that function as a cam are formed at the surface of the stay main body 62 that opposes the cam base 36. The plurality of convex parts 48 of the stay main body 62 fit with the plurality of concave parts 45 of the cam base 36.

The arm 61 is provided with the first link 71 and the second link 72, and the first link 71 is provided with a disk-shaped connection part 71*a* and a main body 71*b* that project radially from the connection part 71*a*. The connection part 71*a* is provided with a circumferential ring-shaped crown 71*a*1 and a ring-shaped ring plate 71*a*2 provided at the inside of the crown 71*a*1. A through-hole 71*a*3 is opened at the center of the ring plate 71*a*2, and the mating part 39*a* of the lid member 39 (see FIG. 21) fits into the through-hole 71*a*3. The rotation of the arm 61 is guided by the mating part 39*a* of the lid member 39.

The second link 72 is connected via a pin 73 to the free end of a main body 71*b* so as to be capable of rotation. An elongated hole 71*b*1 is opened along the main body 71*b* at the free end of the main body 71*b*. A slider 74 is inserted into the hole 71*b*1 so as to be capable of sliding in the longitudinal direction of the main body 71*b*. In order to prevent tilting of the slider 74, the cross-sectional shape of the hole 71*b*1 is designed to match the cross-sectional shape of the slider 74. A coil spring 75 is provided inside the hole 71*b*1 as a biasing member to bias the slider 74 to the second link 72.

The slider 74 has a pair of opposing walls 74*b* separated by a slit 74*a*, and a roller 76 is inserted between the pair of opposing walls 74*b*. The roller 76 is supported so as to be rotatable by a pin 77 fixed to the slider 74. The coil spring 75 biases the roller 76 of the slider 74 to a cam 72*a* of the second link 72. An elongated hole through which the pin 73 is passed is formed in the slider 74.

The second link 72 is supported in a rotatable manner by the first link 71 via the pin 73. The cam 72*a* is formed at one end part of the second link 72. The cam 72*a* is provided with an arc-shaped center cam 72*a*1, a first recessed cam 72*a*2 formed at one end part in the circumferential direction of the center cam 72*a*1, and a second recessed cam 72*a*3 formed at the other end of the center cam 72*a*1 (see also FIGS. 22A and 22B). The washer 63 is connected in a rotatable manner via the shaft body 64 to the free end of the second link 72.

Figure 22A:
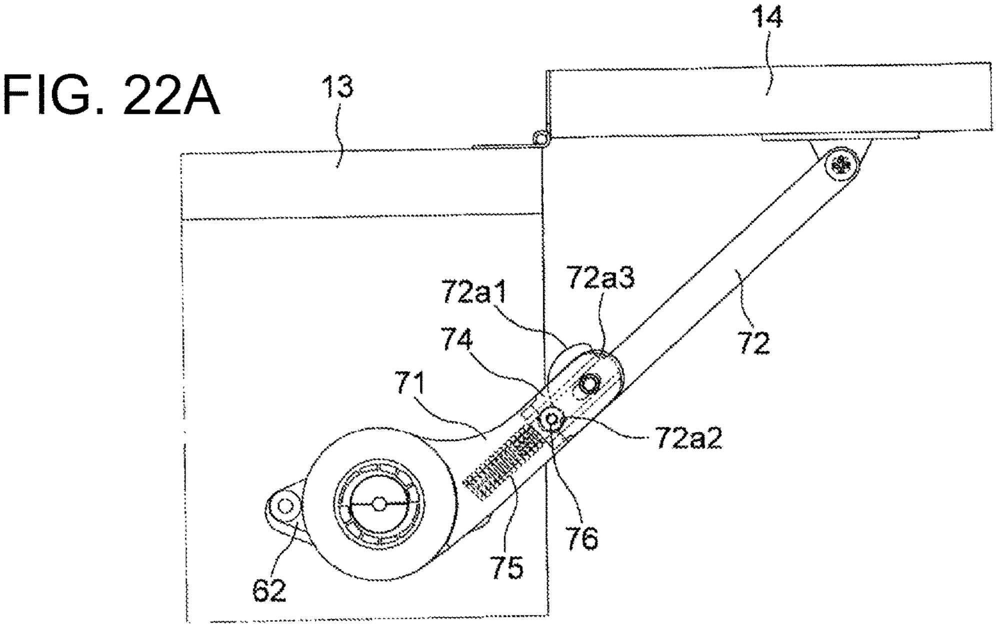
FIGS. 22A and 22B illustrate an exemplary door in an open and closed state using the stay of the second embodiment.

The slider 74 and coil spring 75 of the first link 71 and the cam 72*a* of the second link 72 constitute a catch mechanism. As shown in FIG. 22A, when the door 14 is in an opened state, the roller 76 of the slider 74 fits with the first recessed cam 72*a*2 of the second link 72. The roller 76 of the slider

74 is biased to the first recessed cam 72*a*2 by the coil spring 75, and therefore the opened state of the door 14 is maintained.

When the opened door 14 is closed, the first link 71 and the second link 72 rotate so that the arm 61 bends. When this occurs, the roller 76 of the slider 74 runs onto the arc-shaped center cam 72*a*1 of the second link 72. The radius of the arc-shaped center cam 72*a*1 is uniform, and therefore when the roller 76 of the slider 74 contacts the center cam 72*a*1, torque in the opening direction or the closing direction is not applied to the door 14.

Figure 22B:
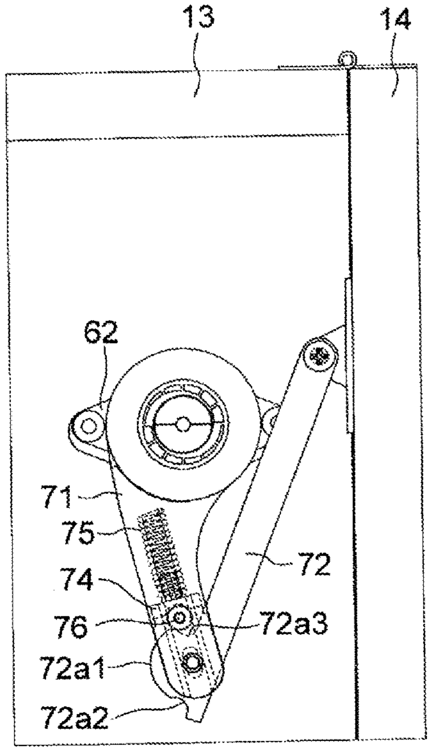

As shown in FIG. 22B, when the door 14 is in a closed state, the arm 61 further bends, and the roller 76 of the slider 74 falls into the second recessed cam 72*a*3 of the second link 72. The roller 76 of the slider 74 is biased to the second recessed cam 72*a*3 by the coil spring 75, and a torque in the closing direction is applied to the door 14. Therefore, the closed state of the door 14 is maintained. Moreover, regardless of whether the door 14 is opened or closed, the main elements of the stay are positioned within the main body 13 of the cabinet, and therefore a cleaner image can be projected compared to the stay of the first embodiment.

Figure 23:
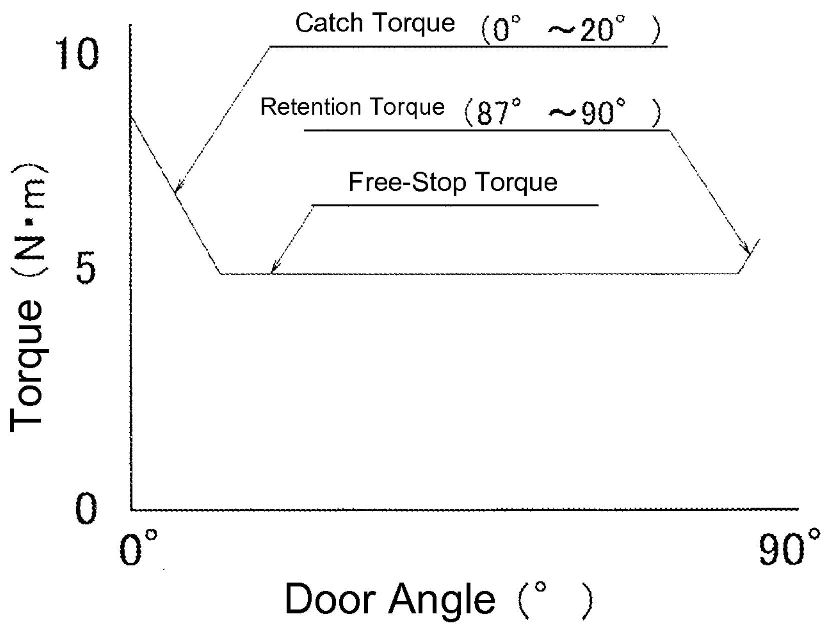
FIG. 23 illustrates the relationship between the opening angle of the door when a stay of the second embodiment is used and the torque acting on the door.
Figure 24A:
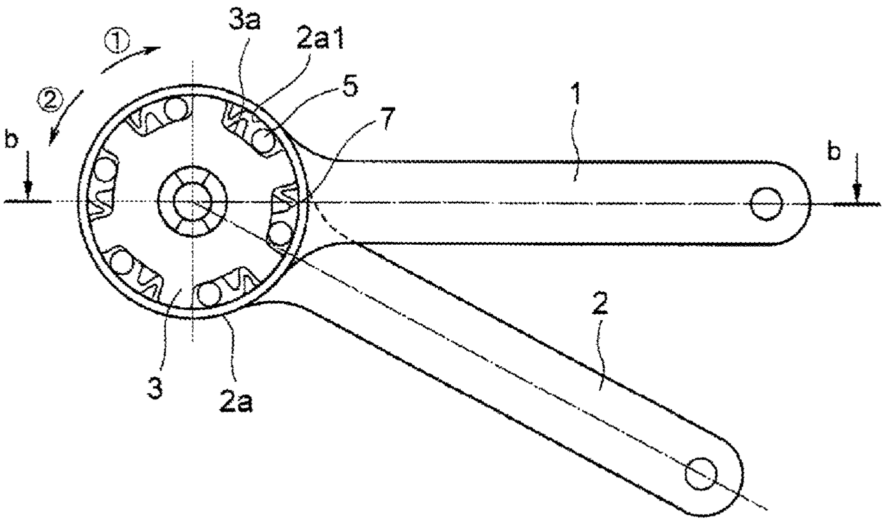
FIGS. 24A and 24B illustrate a conventional stay.
Figure 24B:
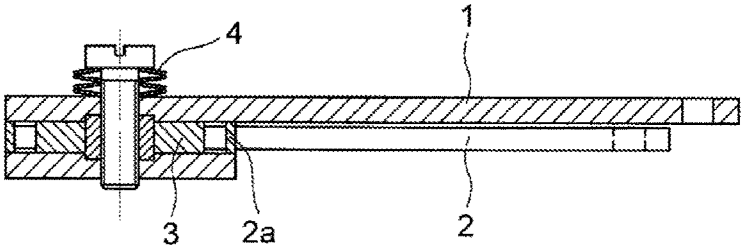

FIG. 23 is a graph showing the relationship between the opening angle of the door 14 and the torque applied to the door 14. When the opening angle of the door 14 is from 0° to less than 20°, a catch torque in the closing direction is applied to the door 14 by the catch mechanism. Therefore, the closed state of the door 14 is maintained (see FIG. 22B). Moreover, when the opening angle is less than 20°, the door 14 is automatically rotated to the fully closed state by the catch torque thereof.

When the opening angle of the door 14 is 20° to less than 87°, torque from the catch mechanism is not applied to the door 14. Only the free-stop torque from the friction damper works on the door 14, and therefore, the door 14 can be maintained at an arbitrary angle of 20° to less than 87°.

When the opening angle of the door 14 is from 87° to 90°, a catch torque in the opening direction is applied to the door 14 by the catch mechanism, and thus the open state of the door 14 can be maintained (see FIG. 22A). Moreover, when the opening angle is 87° or greater, the door 14 is automatically rotated to the fully opened state of 90° by the catch torque.

The stays of the first embodiment and the second embodiment of the present invention were described in detail above. However, the present invention is not limited to the above-described embodiments, and the present invention can be embodied in various embodiments within a scope that does not change the gist of the present invention.

With the above-described embodiments, cases were described where the stay was applied to a cabinet that opens upward, but the present invention may also be applied to a downward opening cabinet.

With the above-described embodiments, the cam base is moved away from the disk by the cam principle of the plurality of teeth of the disk and the plurality of teeth of the cam base, but the cam base can also be moved away from the disk by a cam principle of the convex part of the second arm and the concave part of the cam base.

With the above-described embodiments, a plurality of teeth is formed at opposing surfaces of the cam base and disk, and the rotation of the cam base is transmitted to the disk by the meshing of the plurality of teeth. However, the opposing surfaces of the cam base and the disk may be formed as flat surfaces, and the rotation of the cam base can then be transmitted to the disk by frictional force.

With the above-described embodiments, a resin ring is provided between the disk and the cam base, and movement in the direction of the rotation axis of the cam base with respect to the disk is temporarily maintained. However, movement in the direction of the rotation axis of the cam base can also be temporarily maintained by fitting the disk and cam base.

With the above-described embodiments, the ring plate of the first arm is sandwiched by the pair of friction plates, but a single friction plate may also be used and caused to contact only a single surface of the ring plate.

The shapes and structures of each of the component parts of the stays of the above-described embodiments are for illustrative purposes only, and can be changed to various shapes and structures within a scope that does not change the gist of the present invention.

With the above-described second embodiment, the arm is configured of first and second links which rotate mutually, but the arm can also be configured from first and second slide rails which slide mutually in the longitudinal direction. In this case, the length of the arm changes, but the arm does not bend.

The invention claimed is:

1. A stay comprising:

a first member;

a second member connected to the first member so as to be capable of rotating around a rotation axis in two opposing directions relatively;

a disk joined to the first member through a friction plate; and a cam base capable of rotating around the rotation axis in an integrated manner with the second member, and capable of moving in a direction of the rotation axis through relative rotation of the second member with respect to the first member;

one of the second member and the cam base further comprising a convex part protruding to the other of the second member and the cam base; and the other of the second member and the cam base further comprising a concave part which fits with the convex part;

wherein, when the second member rotates relative to the first member in one direction, the convex part fits with the concave part deeper, the cam base moves away from the disk in the direction of the rotation axis, and the second member and the cam base rotate relative to the first member and the disk; and when the second member rotates relatively to the first member in the other direction, an inclined surface of the convex part and an inclined surface of the concave part come into contact, the cam base moves towards the disk in the direction of the rotation axis, and the second member, the cam base and the disk rotate relative to the first member with resistance force.

2. The stay according to claim 1, the disk and the cam base further comprising a plurality of teeth at mutually opposing surfaces;

wherein, when the second member rotates relative to the first member in the one direction, the plurality of teeth of the disk and the plurality of teeth of the cam base come into contact, resulting in the cam base moving away from the disk in the direction of the rotation axis.

3. The stay according to claim 2, wherein the plurality of teeth of the disk and the cam base are arranged at the mutually opposing surfaces in a ring shape around the rotation axis.

4. The stay according to claim 1, wherein the first member is elongated, one end of the first member is capable of rotating with respect to one of a main body and a door;

the second member is elongated, one end of the second member is capable of rotating with respect to the other of the main body and the door; and the other end of the first member and the other end of the second member are capable of rotating against each other.

5. The stay according to claim 1, wherein one end of the first member is capable of rotating with respect to one of a main body and a door;

the second member is fixed to the other one of the main body and the door; and the other end of the first member and the second member are capable of rotating.

6. The stay according to claim 5, wherein the first member is capable of bending at a middle part between the one end and the other end; and the first member further comprising a catch mechanism which retains a state where the first member is extended, and retains a state where the first member is bent.

7. A stay comprising:

a first member;

a second member connected to the first member so as to be capable of rotating around a rotation axis in two opposing directions relatively;

a disk joined to the first member through frictional force; and a cam base capable of rotating around the rotation axis in an integrated manner with the second member, and capable of moving in a direction of the rotation axis through relative rotation of the second member with respect to the first member;

a position retention means between the disk and the cam base for allowing the cam base to move in the direction of the rotation axis with respect to the disk, and for temporarily retaining a position of the cam base in the direction of the rotation axis;

wherein, when the second member rotates relative to the first member in one direction, the cam base moves away from the disk in the direction of the rotation axis, and the second member and the cam base rotate relative to the first member and the disk; and when the second member rotates relatively to the first member in the other direction, the cam base moves towards the disk in the direction of the rotation axis, and the second member, the cam base and the disk rotate relative to the first member with resistance force.

8. The stay according to claim 7, wherein the position retention means is a resin ring which is supported by either the disk or the cam base and slides on the other.

* * * * *